US010947336B2

(12) United States Patent
Kanagawa

(10) Patent No.: US 10,947,336 B2
(45) Date of Patent: Mar. 16, 2021

(54) MOISTURE CURABLE HOT MELT URETHANE COMPOSITION, METHOD FOR PRODUCING CURED FOAM OF SAME, SYNTHETIC LEATHER AND METHOD FOR PRODUCING SYNTHETIC LEATHER

(71) Applicant: DIC Corporation, Tokyo (JP)

(72) Inventor: Yoshinori Kanagawa, Osaka (JP)

(73) Assignee: DIC CORPORATION, Tokyo (JP)

( * ) Notice: Subject to any disclaimer, the term of this patent is extended or adjusted under 35 U.S.C. 154(b) by 51 days.

(21) Appl. No.: 15/756,852

(22) PCT Filed: Jun. 9, 2016

(86) PCT No.: PCT/JP2016/067218
§ 371 (c)(1),
(2) Date: Mar. 1, 2018

(87) PCT Pub. No.: WO2017/038195
PCT Pub. Date: Mar. 9, 2017

(65) Prior Publication Data
US 2019/0055339 A1 Feb. 21, 2019

(30) Foreign Application Priority Data

Sep. 2, 2015 (JP) ................................. 2015-172935
Nov. 11, 2015 (JP) ................................. 2015-221298
Nov. 11, 2015 (JP) .............................. JP2015-221299

(51) Int. Cl.
*C08G 18/12* (2006.01)
*B32B 27/12* (2006.01)
(Continued)

(52) U.S. Cl.
CPC .............. *C08G 18/12* (2013.01); *B32B 5/022* (2013.01); *B32B 5/20* (2013.01); *B32B 7/12* (2013.01);
(Continued)

(58) Field of Classification Search
CPC ........ C09J 175/08; C09J 5/06; C09J 2475/00; B32B 7/12; B32B 27/40; B32B 2375/00; B32B 2305/022; C08J 9/107
See application file for complete search history.

(56) References Cited

U.S. PATENT DOCUMENTS 2,824,076 A * 2/1958 Fuller ...................... C08J 9/107
521/73

FOREIGN PATENT DOCUMENTS

JP   S61-055127 A   3/1986
JP   2003-306523 A   10/2003
(Continued)

OTHER PUBLICATIONS

Translation of JP 2003-277459, Mizoguchi, Oct. 2, 2003. (Year: 2003).*

(Continued)

*Primary Examiner* — Hai Vo
(74) *Attorney, Agent, or Firm* — McDermott Will & Emery LLP

(57) ABSTRACT

The present invention provides a moisture-curable hot melt urethane composition, including a hot melt urethane prepolymer (A) having an isocyanate group and a foaming agent composition (B) containing N,N'-dinitrosopentamethylenetetramine (b1), urea (b2) and a polyol (b3). The present invention also provides a method for producing a foamed and cured product of a moisture-curable hot melt composition, which includes heat-melting a hot melt urethane prepolymer (A), then mixing the foaming agent composition (B) therewith, applying the resultant mixture to a substrate, and performing a heating treatment at a temperature equal to or higher than heat-melting temperature of the (A) to thereby cause foaming and curing. An object of the present invention is to provide a solvent-free foaming system, according to which a foamed and cured product with excellent texture can
(Continued)

be obtained, and an excellent foamed state can be maintained even in a thin film.

9 Claims, 3 Drawing Sheets

(51) Int. Cl.
| | |
|---|---|
| B32B 27/40 | (2006.01) |
| C08G 18/48 | (2006.01) |
| C08G 18/76 | (2006.01) |
| C08J 9/10 | (2006.01) |
| C08G 18/40 | (2006.01) |
| C08G 18/42 | (2006.01) |
| C08G 18/44 | (2006.01) |
| D06N 3/14 | (2006.01) |
| B32B 5/20 | (2006.01) |
| B32B 5/02 | (2006.01) |
| B32B 27/32 | (2006.01) |
| B32B 7/12 | (2006.01) |
| B32B 37/12 | (2006.01) |
| C09J 5/06 | (2006.01) |
| C09J 175/08 | (2006.01) |
| D06N 3/00 | (2006.01) |
| C08G 101/00 | (2006.01) |

(52) U.S. Cl.
CPC .............. *B32B 27/12* (2013.01); *B32B 27/32* (2013.01); *B32B 27/40* (2013.01); *B32B 37/1207* (2013.01); *C08G 18/4018* (2013.01); *C08G 18/4202* (2013.01); *C08G 18/4222* (2013.01); *C08G 18/4238* (2013.01); *C08G 18/4252* (2013.01); *C08G 18/44* (2013.01); *C08G 18/4812* (2013.01); *C08G 18/4825* (2013.01); *C08G 18/4829* (2013.01); *C08G 18/4854* (2013.01); *C08G 18/7642* (2013.01); *C08G 18/7664* (2013.01); *C08G 18/7671* (2013.01); *C08J 9/107* (2013.01); *C09J 5/06* (2013.01); *C09J 175/08* (2013.01); *D06N 3/0059* (2013.01); *D06N 3/14* (2013.01); *B32B 2255/02* (2013.01); *B32B 2255/26* (2013.01); *B32B 2305/022* (2013.01); *B32B 2375/00* (2013.01); *C08G 2101/00* (2013.01); *C08G 2170/20* (2013.01); *C08J 2201/022* (2013.01); *C08J 2203/04* (2013.01); *C08J 2203/18* (2013.01); *C08J 2375/04* (2013.01); *C08J 2375/08* (2013.01); *C09J 2475/00* (2013.01)

(56) References Cited

FOREIGN PATENT DOCUMENTS

| | | | |
|---|---|---|---|
| JP | 2003-306526 A | | 10/2003 |
| JP | 2003277459 A | * | 10/2003 |
| JP | 2004-115705 A | | 4/2004 |
| WO | 2009/119752 A | | 10/2009 |
| WO | 2014/192283 A | | 12/2014 |

OTHER PUBLICATIONS

Search Report issued in corresponding International Patent Application No. PCT/JP2016/067218, dated Sep. 6, 2016.

* cited by examiner

[fig. 1]
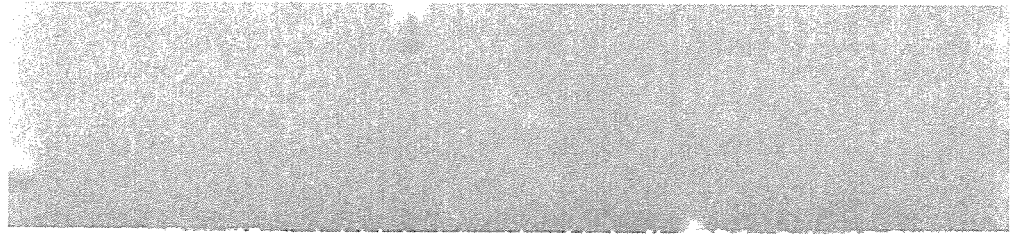
[fig. 2]
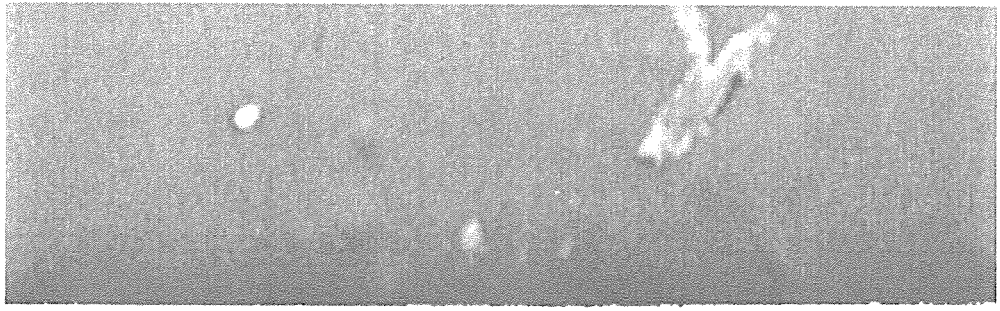
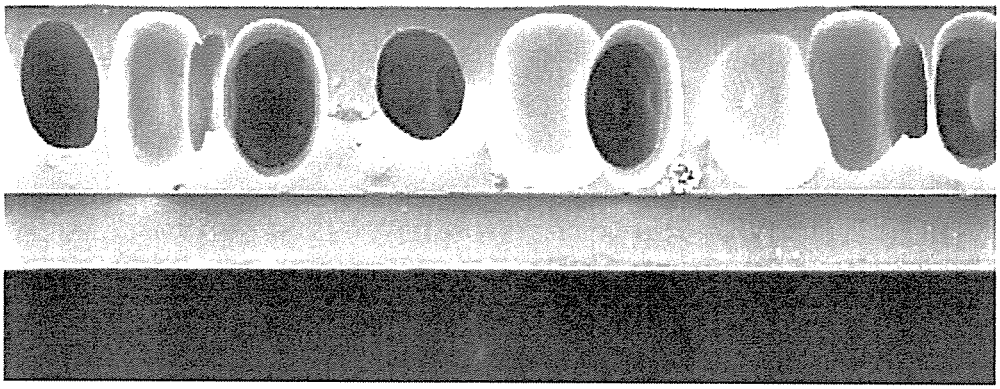

[fig. 3]
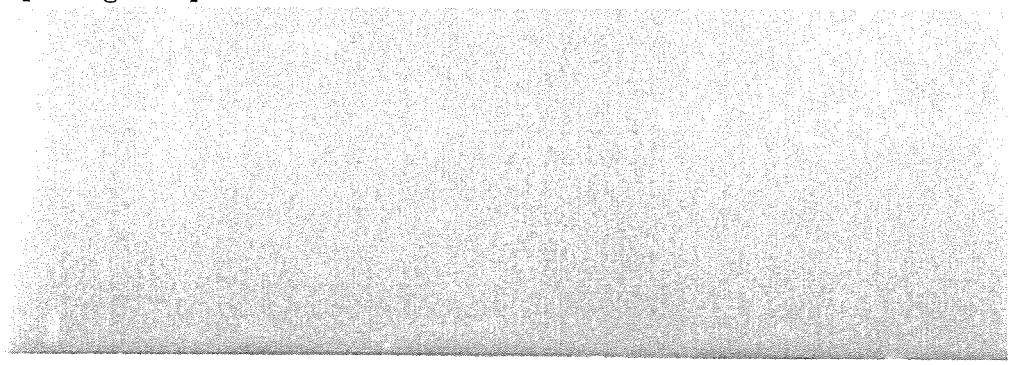
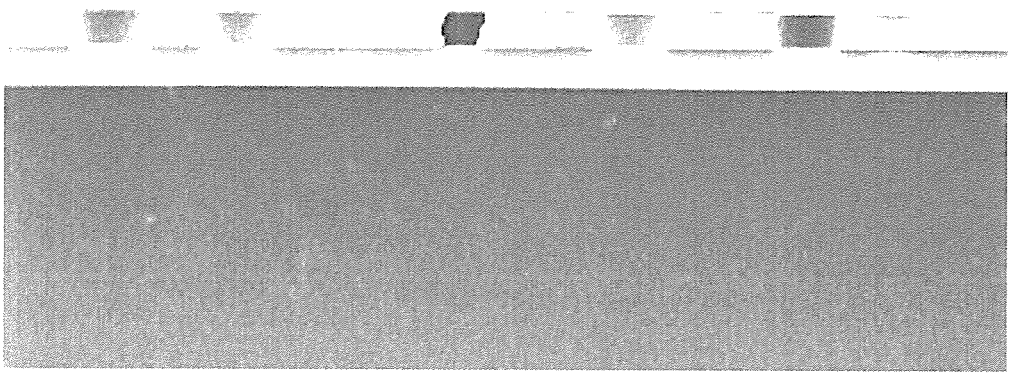
[fig. 4]
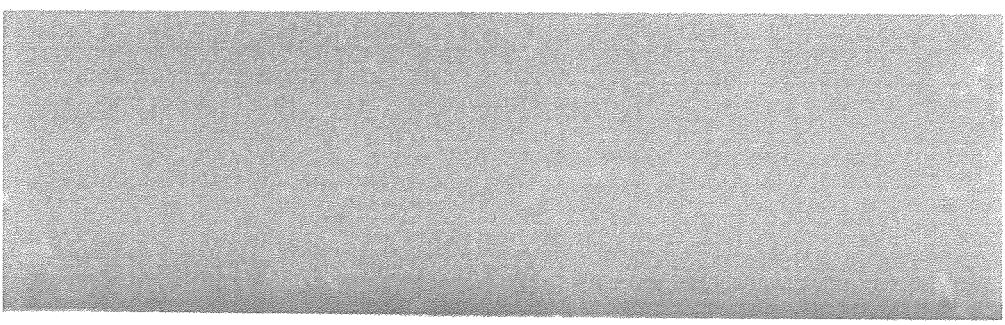
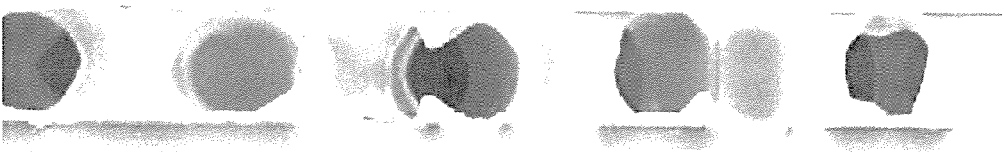
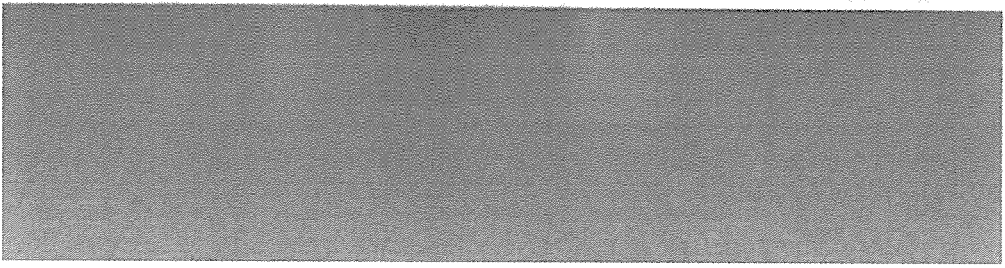

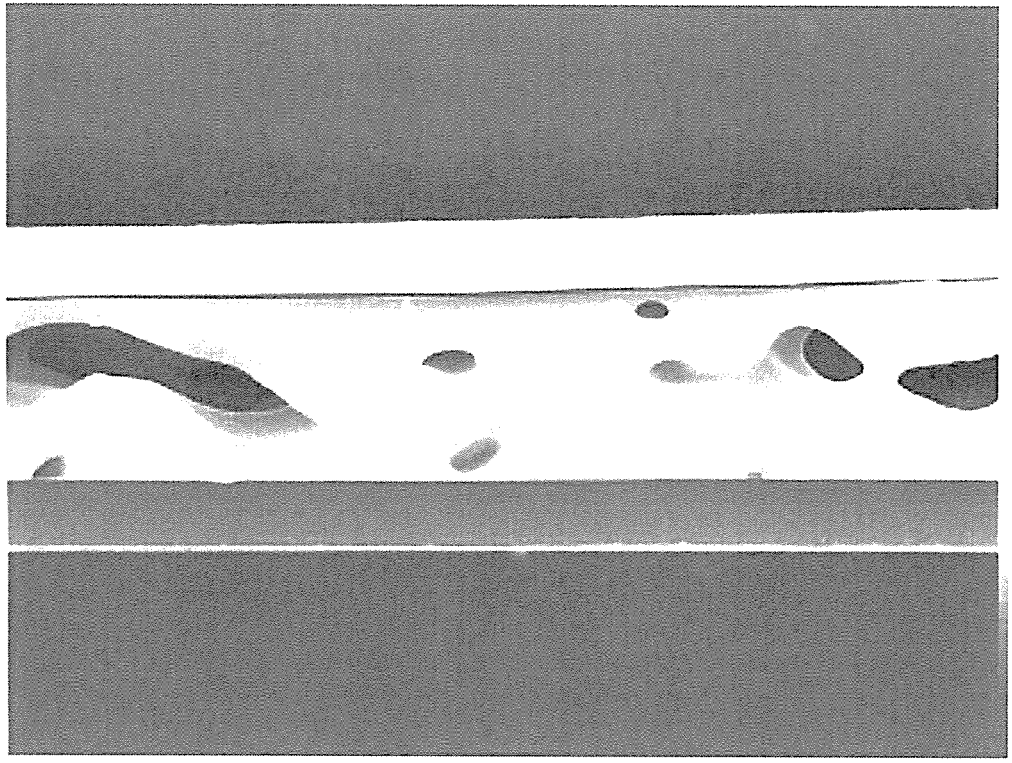
[fig 5]

MOISTURE CURABLE HOT MELT URETHANE COMPOSITION, METHOD FOR PRODUCING CURED FOAM OF SAME, SYNTHETIC LEATHER AND METHOD FOR PRODUCING SYNTHETIC LEATHER

CROSS REFERENCE

This application is the U.S. National Phase under 35 U.S.C. § 371 of International Application No. PCT/JP2016/067218, filed on Jun. 9, 2016, which claims the benefit of Japanese Application No. 2015-172935, filed on Sep. 2, 2015, Japanese Application No. 2015-221298, filed on Nov. 11, 2015, and Japanese Application No. 2015-221299, filed on Nov. 11, 2015, the entire contents of each are hereby incorporated by reference.

TECHNICAL FIELD

The present invention provides a moisture-curable hot melt urethane composition, a method for producing a foamed and cured product of the same, a synthetic leather, and a method for producing the same.

BACKGROUND ART

With the regulations on the use of dimethylformamide (DMF) gaining momentum in Europe, it is highly desirable to provide a solvent-free, energy-saving, environmentally responsible resin. In this situation, a moisture-curable hot melt urethane composition, which is solvent-free, is attracting much attention and has been widely used in the production of synthetic leathers, building materials, automotive interior materials, refrigerators, smartphones, personal computers, and car navigation systems, and like electrical and electric devices, for example. In particular, in recent years, for the purposes of improving the impact resistance and texture through the buffering effect, reducing the usage of moisture-curable hot melt urethane compositions, and the like, moisture-curable hot melt urethane compositions are increasingly foamed and used as foamed and cured products.

As a method for foaming and curing the moisture-curable hot melt urethane composition, a water foaming method, which uses water or steam, has been widely studied (see, e.g., PTLs 1 and 2). In the water foaming method, water or steam reacts with the isocyanate groups in a moisture-curable hot melt urethane to produce carbon dioxide, and such carbon dioxide is allowed to remain as bubbles in the cured product. In addition, in the water foaming method, generally, the moisture-curable hot melt urethane is vigorously stirred with moisture or the like to increase the bubble generation rate, and the bubbles involved during vigorous stirring are positively allowed to remain.

However, in the water foaming method described above, the foaming degree varies depending on the mixed state in the system upon vigorous stirring. Accordingly, when the production is scaled up from experiment facilities to production facilities, it is extremely difficult to produce a foamed and cured product having a uniform foamed state stably with high reproducibility. In particular, in the water foaming method, particularly in the case where the foamed and cured product is in the form of a thin film having a thickness of less than 100 μm, it often happens that carbon dioxide escapes from the film, and there remain only bubbles involved during vigorous stirring. Thus, it has been extremely difficult to make a design such that an excellent foamed state can be formed stably with high reproducibility.

As a foaming method other than the water foaming method, for example, a method in which a composition containing a ketoxime-blocked urethane prepolymer, an aliphatic diamine, thermally expandable fine particles, and DMF is heated and foamed has been disclosed (see, e.g., PTL 3). However, this method uses DMF, and also the heating temperature is as extremely high as 180° C., which possibly adversely affects the substrate or base fabric. In addition, there also is a problem in that because the thermally expandable fine particles are solid and hard even after heating and foaming, the texture of the resulting foamed and cured product is poor.

Meanwhile, a synthetic leather, which is actively studied in recent years as an application example of polyurethane, generally includes a base fabric, an intermediate layer, and a surface skin layer, and such synthetic leathers have been widely utilized for the production of car interior materials, furnishings, moisture-permeable waterproof clothes, and the like. As the intermediate layer, generally, a foamed layer or porous layer formed from an N,N-dimethylformamide (DMF) solution of polyurethane by wet processing or the like is used. However, as described above, the regulations on the use of DMF are gaining momentum in Europe and China. Accordingly, also in synthetic leather applications, there is an urgent need for reduction in use or shift toward a solvent-free system.

As a method for DMF reduction in the formation of an intermediate layer, for example, the method as described in the PTL 3 has been disclosed. However, in the above method, the amount of DMF used is still large, and also the heating temperature is as extremely high as 180° C., which possibly adversely affects the base fabric or release paper, for example. In addition, there also is a problem in that because the thermally expandable fine particles are solid and hard even after heating and foaming, the texture of the resulting synthetic leather is poor.

Meanwhile, as a method in which no DMF is used for the formation of an intermediate layer, for example, the water foaming method as described in the PTL 1 or 2, which uses water or steam, has been widely studied. However, in the water foaming method described above, the foaming degree varies depending on the mixed state in the system upon vigorous stirring. Accordingly, when the production is scaled up from experiment facilities to production facilities, it is extremely difficult to produce an intermediate layer having a uniform foamed state stably with high reproducibility. In addition, in the water foaming method, particularly in the case where the intermediate layer is in the form of a thin film having a thickness of less than 100 μm, it often happens that carbon dioxide escapes from the film, and there remain only bubbles involved during vigorous stirring. Thus, it has been extremely difficult to make a design such that an excellent foamed state can be formed stably with high reproducibility.

CITATION LIST

Patent Literature

PTL 1: JP-A-2004-115705
PTL 2: JP-A-2003-306526
PTL 3: WO 2014/192283

SUMMARY OF INVENTION

Technical Problem

An object of the present invention is to provide a solvent-free foaming system, according to which a foamed and cured product with excellent texture can be obtained, and an excellent foamed state can be maintained even in a thin film.

Solution to Problem

The present invention provides a moisture-curable hot melt urethane composition, including a hot melt urethane prepolymer (A) having an isocyanate group and a foaming agent composition (B) containing N,N'-dinitrosopentamethylenetetramine (b1), urea (b2) and a polyol (b3).

The present invention also provides a method for producing a foamed and cured product of a moisture-curable hot melt urethane composition, which includes heat-melting a hot melt urethane prepolymer (A) having an isocyanate group, then mixing a foaming agent composition (B) containing N,N'-dinitrosopentamethylenetetramine (b1), urea (b2), and a polyol (b3) therewith, applying the resultant mixture to a substrate, and performing a heating treatment at a temperature equal to or higher than the heat-melting temperature of the hot melt urethane prepolymer (A) to thereby cause foaming and curing.

The present invention also provides a synthetic leather including a base fabric (i), an intermediate layer (ii), and a surface skin layer (iii), in which the intermediate layer (ii) is a foamed and cured product of the above moisture-curable hot melt urethane composition.

The present invention further provides a method for producing a synthetic leather, which includes heat-melting a hot melt urethane prepolymer (A) having an isocyanate group, then mixing a foaming agent composition (B) containing N,N'-dinitrosopentamethylenetetramine (b1), urea (b2), and a polyol (b3) therewith to give a moisture-curable hot melt urethane composition, applying the moisture-curable hot melt composition onto a surface skin layer (iii) formed on a release paper, performing a heating treatment at a temperature equal to or higher than the heat-melting temperature of the hot melt urethane prepolymer (A) to form an intermediate layer (ii), and subsequently attaching a base fabric (i) onto the intermediate layer (ii).

Advantageous Effects of Invention

In the moisture-curable hot melt urethane composition of the present invention, a specific heat-decomposable foaming agent is used. As a result, an excellent foamed state can be maintained even in a thin film, and a foamed and cured product with excellent texture can be obtained. In addition, even after foaming, no deterioration is caused in the mechanical properties of the foamed and cured product. In addition, foaming can be caused without the influence of water. Thus, even in the case where the moisture-curable hot melt urethane composition is once cooled and solidified from a melted state, or even during moisture curing, by performing a heating treatment again, the foaming of the heat-decomposable foaming agent can be promoted.

In addition, in the synthetic leather of the present invention, an organic solvent, such as DMF, is not used in the formation of an intermediate layer. As a result, the synthetic leather has less adverse effects on human health. In addition, because a specific heat-decomposable foaming agent is used in the formation of an intermediate layer, an excellent foamed state can be maintained even in the case where the intermediate layer is a thin film, and an intermediate layer and a synthetic leather with excellent texture can be obtained.

BRIEF DESCRIPTION OF DRAWINGS

FIG. 1 shows an electron micrograph of a cross-sectional view of a foamed and cured product obtained in Example 1 (magnification: 200).

FIG. 2 shows an electron micrograph of a cross-sectional view of a foamed and cured product obtained in Example 15 (magnification: 200).

FIG. 3 shows an electron micrograph of a cross-sectional view of a foamed and cured product obtained in Comparative Example 1 (magnification: 200).

FIG. 4 shows an electron micrograph of a cross-sectional view of a foamed and cured product obtained in Comparative Example 2 (magnification: 200).

FIG. 5 shows an electron micrograph of a cross-sectional view of a foamed and cured product obtained in Comparative Example 4 (magnification: 200).

DESCRIPTION OF EMBODIMENTS

The moisture-curable hot melt urethane composition of the present invention includes, as essential components, a hot melt urethane prepolymer (A) having an isocyanate group and a foaming agent composition (B) containing N,N'-dinitrosopentamethylenetetramine (b1), urea (b2), and a polyol (b3).

In the present invention, the foaming agent composition (B) essentially contains N,N'-dinitrosopentamethylenetetramine (b1), urea (b2), and a polyol (b3). When this specific foaming agent composition is used, a foamed and cured product with excellent texture can be obtained without causing deterioration in the mechanical properties of the foamed and cured product, and an excellent foamed state can be maintained even in a thin film. In addition, foaming can be caused without the influence of water. Thus, even in the case where the moisture-curable hot melt urethane composition is once cooled and solidified from a melted state, or even during moisture curing, by performing a heating treatment again, foaming can be caused.

The N,N'-dinitrosopentamethylenetetramine (b1) functions as a heat-decomposable foaming agent. The (b1) has been mainly used as a foaming agent for natural rubber and synthetic rubber, and is known to generate an extremely large amount of gas or an extremely large amount of heat upon decomposition. Thus, such an agent has been believed to be unsuitable for use in a moisture-curable hot melt urethane composition, which is applied in a heat-melted state to a substrate or the like and used, because the agent is expected to undergo thermal decomposition immediately after mixing. However, it has been found that whereas the hot melt urethane prepolymer (A) used in the moisture-curable hot melt urethane composition is usually heat-melted at a temperature of 80 to 120° C., the (b1) foams when subjected to a heating treatment at a temperature equal to or higher than this temperature range (hereinafter abbreviated to "post-heating"), and an excellent foamed state can be formed and maintained even in a thin film. In this case, it is presumed that the component after the thermal decomposition of the (b1) has reacted with the isocyanate groups in the hot melt urethane prepolymer (A) and thus immobilized the bubbles. Although there are a large number of heat-decomposable foaming agents that generate an increased amount of gas in a temperature region equal to or higher than the heat-melting temperature of the hot melt urethane prepolymer (A), in the case of heat-decomposable foaming agents other than the (b1), the component after thermal decomposition does not react with the isocyanate groups in the hot melt urethane prepolymer (A). Accordingly, it is difficult to immobilize bubbles, and the obtained bubbles may deform or collapse after curing, leading to a problem in that the texture of the resulting foamed and cured product is impaired, or the surface appearance is impaired due to asperities.

The amount of the N,N'-dinitrosopentamethylenetetramine (b1) used is preferably in the range of 3 to 50 mass % in the foaming agent composition (B), and more preferably in the range of 5 to 40 mass %, since an excellent foamed state can be formed by post-heating, and less adverse effects are caused on the mechanical properties of the foamed and cured product.

The urea (b2) functions as a foaming aid for the (b1). In the case where the urea (b2) is not used, although foaming takes place, the bubbles may deform or collapse after curing, or the foaming of the (b1) may be uncontrollable, whereby the texture or surface appearance of the resulting foamed and cured product is impaired. The amount of the urea (b2) used is preferably in the range of 3 to 50 mass % in the foaming agent composition (B), and more preferably in the range of 8 to 40 mass %, since an excellent foamed state can be formed by post-heating even in a thin film.

The mass ratio [(b1)/(b2)] between the N,N'-dinitrosopentamethylenetetramine (b1) and urea (b2) is preferably in the range of 10/90 to 90/10, and more preferably in the range of 30/70 to 70/30, since an excellent foamed state can be formed by post-heating even in a thin film.

The polyol (b3) functions as a vehicle and is used in order to uniformly mix the (b1) and (b2) in the hot melt urethane prepolymer (A).

As the polyol (b3), for example, it is possible to use a polyester polyol, a polyether polyol, a polycarbonate polyol, a polyacrylic polyol, a polyolefin polyol, a castor oil polyol, a polyhydric alcohol, or the like; a copolymer thereof; etc. These polyols may be suitably determined according to the intended use of the foamed and cured product. They may be used alone, and it is also possible to use two or more kinds together.

As the polyether polyol, for example, it is possible to use a polymerization product of a polyhydric alcohol and an alkylene oxide.

As the polyhydric alcohol, for example, it is possible to use a glycol such as ethylene glycol, 1,2-propylene glycol, 1,3-propylene glycol, 1,3-butylene glycol, 1,4-butylene glycol, 1,5-pentanediol, 2,2-dimethyl-1,3-propanediol, 1,6-hexanediol, 3-methyl-1,5-pentanediol, 1,8-octanediol, diethylene glycol, triethylene glycol, dipropylene glycol, tripropylene glycol, cyclohexane-1,4-diol, or cyclohexane-1,4-dimethanol; a polyester polyol; etc. These compounds may be used alone, and it is also possible to use two or more kinds together.

As the alkylene oxide, for example, it is possible to use ethylene oxide, propylene oxide, butylene oxide, styrene oxide, etc. These compounds may be used alone, and it is also possible to use two or more kinds together.

As the polyester polyol, for example, it is possible to use a polymerization product of a polyhydric alcohol and a polybasic acid; a polymerization product of the polyether polyol and a lactone compound; etc.

As the polyhydric alcohol, for example, it is possible to use ethylene glycol, 1,2-propylene glycol, 1,3-propylene glycol, 1,3-butylene glycol, 1,4-butylene glycol, 2,2-dimethyl-1,3-propanediol, 1,6-hexanediol, 3-methyl-1,5-pentanediol, 1,8-octanediol, diethylene glycol, triethylene glycol, dipropylene glycol, tripropylene glycol, cyclohexane-1,4-diol, cyclohexane-1,4-dimethanol, an ethylene oxide or propylene oxide adduct of bisphenol A, etc. These polyhydric alcohols may be used alone, and it is also possible to use two or more kinds together.

As the polybasic acid, for example, it is possible to use succinic acid, maleic acid, adipic acid, glutaric acid, pimelic acid, suberic acid, azelaic acid, sebacic acid, dodecanedicarboxylic acid, phthalic acid, isophthalic acid, terephthalic acid, hexahydroisophthalic acid, etc. These polybasic acids may be used alone, and it is also possible to use two or more kinds together.

As the lactone compound, for example, it is also possible to use a polymerization product obtained by the ring-opening addition of γ-butyrolactone or ε-caprolactone.

As the polycarbonate polyol, for example, it is possible to use one obtained by allowing a carbonate and/or a phosgene to react with a compound having two or more hydroxyl groups.

As the carbonate, for example, it is possible to use dimethyl carbonate, diethyl carbonate, diphenyl carbonate, ethylene carbonate, propylene carbonate, etc. These compounds may be used alone, and it is also possible to use two or more kinds together.

As the compound having two or more hydroxyl groups, for example, it is possible to use ethylene glycol, propylene glycol, 1,3-propanediol, 1,4-butanediol, 1,3-butanediol, 1,2-butanediol, 2-methyl-1,3-propanediol, 1,5-pentanediol, neopentyl glycol, 1,6-hexanediol, 1,5-dihydroxyhexane, 3-methyl-1,5-pentanediol, 1,7-heptanediol, 1,8-octanediol, 1,9-nonanediol, 1,8-nonanediol, 2-ethyl-2-butyl-1,3-propanediol, 1,10-decanediol, 1,12-dodecanediol, 1,4-cyclohexanedimethanol, 1,3-cyclohexanedimethanol, trimethylolpropane, trimethylolethane, glycerin, etc. These compounds may be used alone, and it is also possible to use two or more kinds together.

As the polyol (b3), among those described above, in terms of reaction with the hot melt urethane prepolymer (A), and since a foamed and cured product or a synthetic leather with excellent texture can be obtained, it is preferable to use a polyether polyol, it is preferable to use a polyoxypropylene polyol, and it is more preferable to use a polymerization product of polyoxypropylene triol and/or glycerin and propylene oxide.

In terms of ease of mixing with the hot melt urethane prepolymer (A), the number average molecular weight of the polyol (b3) is preferably in the range of 500 to 10,000, and more preferably in the range of 700 to 5,000. Incidentally, the number average molecular weight of the polyol (b3) refers to a value measured by gel permeation chromatography (GPC) under the following conditions.

Measuring device: High-performance GPC device ("HLC-8220GPC" manufactured by Tosoh Corporation)

Column: The following columns manufactured by Tosoh Corporation were connected in series and used.

"TSKgel G5000" (7.8 mm I.D.×30 cm)×1
"TSKgel G4000" (7.8 mm I.D.×30 cm)×1
"TSKgel G3000" (7.8 mm I.D.×30 cm)×1
"TSKgel G2000" (7.8 mm I.D.×30 cm)×1

Detector: RI (differential refractometer)
Column temperature: 40° C.
Eluent: Tetrahydrofuran (THF)
Flow rate: 1.0 mL/min
Injection volume: 100 μL (tetrahydrofuran solution having a sample concentration of 0.4 mass %)
Standard: Calibration curves were prepared using the following standard polystyrenes.

(Standard Polystyrene)

"TSKgel Standard Polystyrene A-500" manufactured by Tosoh Corporation

"TSKgel Standard Polystyrene A-1000" manufactured by Tosoh Corporation

"TSKgel Standard Polystyrene A-2500" manufactured by Tosoh Corporation

"TSKgel Standard Polystyrene A-5000" manufactured by Tosoh Corporation

"TSKgel Standard Polystyrene F-1" manufactured by Tosoh Corporation

"TSKgel Standard Polystyrene F-2" manufactured by Tosoh Corporation

"TSKgel Standard Polystyrene F-4" manufactured by Tosoh Corporation

"TSKgel Standard Polystyrene F-10" manufactured by Tosoh Corporation

"TSKgel Standard Polystyrene F-20" manufactured by Tosoh Corporation

"TSKgel Standard Polystyrene F-40" manufactured by Tosoh Corporation

"TSKgel Standard Polystyrene F-80" manufactured by Tosoh Corporation

"TSKgel Standard Polystyrene F-128" manufactured by Tosoh Corporation

"TSKgel Standard Polystyrene F-288" manufactured by Tosoh Corporation

"TSKgel Standard Polystyrene F-550" manufactured by Tosoh Corporation

In terms of ease of mixing with the hot melt urethane prepolymer (A) and the mechanical properties of the foamed and cured product, the amount of the polyol (b3) used is preferably in the range of 30 to 90 mass % in the foaming agent composition (B), and more preferably in the range of 40 to 80 mass %.

In addition, the mass ratio [(b1)+(b2)/(b3)] between the total mass of the N,N'-dinitrosopentamethylenetetramine (b1) and urea (b2) and the polyol (b3) is preferably in the range of 10/90 to 70/30, and more preferably in the range of 30/70 to 60/40, since the mixture does not become pasty, whereby fluidity can be ensured to give excellent workability, and also in terms of excellent miscibility with the hot melt urethane prepolymer (A).

The foaming agent composition (B) contains the (b1) to (b3) as essential components, and may also contain other additives as necessary.

As the other additives, for example, it is possible to use heat-decomposable foaming agents other than the (b1), such as azodicarbonamide, 4,4'-oxybis(benzenesulfonyl hydrazide), and sodium hydrogen carbonate; boric acid (b4); etc. These additives may be used alone, and it is also possible to use two or more kinds together. Among them, it is preferable to use boric acid (b4), since the foaming aid function of the urea (b2) is further enhanced, whereby larger bubbles can be formed, and a foamed and cured product or a synthetic leather with even superior texture can be obtained.

In the case where the boric acid (b4) is used, the amount used is preferably in the range of 5 to 150 parts by mass, more preferably in the range of 10 to 120 parts by mass, per 100 parts by mass of the urea (b2).

The amount of the foaming agent composition (B) used is preferably in the range of 1 to 30 parts by mass, more preferably in the range of 5 to 25 parts by mass, per 100 parts by mass of the hot melt urethane prepolymer (A), since a foamed and cured product or a synthetic leather with excellent texture can be obtained without causing deterioration in the mechanical properties of the foamed and cured product, and an excellent foamed state can be maintained even in a thin film.

The hot melt urethane prepolymer (A) having an isocyanate group is solid at room temperature and preferably melts at a temperature of 80 to 120° C. The melt viscosity at 100° C. of the hot melt urethane prepolymer (A) measured with a cone-plate viscometer is preferably in the range of 100 to 100,000 mPa·s, and more preferably in the range of 500 to 70,000 mPa·s. Incidentally, the melt viscosity of the hot melt urethane prepolymer (A) refers to a value measured as follows. The hot melt urethane prepolymer (A) is melted at 100° C. for 1 hour and then subjected to measurement using a cone-plate viscometer (Digital Cone Viscometer "CV-1S, RT Type" manufactured by MST Engineering Co., Ltd.).

The hot melt urethane prepolymer (A) may be a known prepolymer. For example, it is possible to use a reaction product between a polyol (a1) and a polyisocyanate (a2).

As the polyol (a1), those same as the examples of the polyol (b3) are usable. These polyols may be suitably determined according to the intended use. They may be used alone, and it is also possible to use two or more kinds together. Among them, in the case where the synthetic leather of the present invention is used in applications where excellent bending resistance and hydrolysis resistance are required, it is preferable to use polyoxytetramethylene glycol in an amount of 50 mass % or more in the polyol (a1), and more preferably in the range of 60 to 90 mass %. In addition, in the case where the synthetic leather of the present invention is used in applications where excellent durability is required, it is preferable to use a polycarbonate polyol in an amount of 50 mass % or more in the polyol (a1), and more preferably in the range of 60 to 90 mass %.

In addition, in the case where polyoxytetramethylene glycol is used as the polyol (a1), it is preferable to use a polyester polyol together, and it is more preferable to use an aromatic polyester polyol together, since the cohesive strength is improved, whereby even more excellent bending resistance, hydrolysis resistance, and heat resistance can be obtained, and an excellent foamed state can be formed even in a thin film. In addition, in the case where a polycarbonate polyol is used as the polyol (a1), it is preferable to use a polyester polyol together, since the cohesive strength is improved, whereby even more excellent flexibility, hydrolysis resistance, and heat resistance can be obtained, and an excellent foamed state can be formed even in a thin film.

The number average molecular weight of the polyol (a1) is preferably in the range of 500 to 7,000, and more preferably in the range of 700 to 4,000, in terms of mechanical properties. Incidentally, the number average molecular weight of the polyol (a1) refers to a value measured in the same manner as for the number average molecular weight of the polyol (b3).

As the polyisocyanate (a2), for example, it is possible to use an aromatic polyisocyanate such as polymethylenepolyphenyl polyisocyanate, diphenylmethane diisocyanate, polymeric diphenylmethane diisocyanate, carbodiimide-modified diphenylmethane diisocyanate, xylylene diisocyanate, phenylene diisocyanate, tolylene diisocyanate, or naphthalene diisocyanate; an aliphatic or alicyclic polyisocyanate such as hexamethylene diisocyanate, lysine diisocyanate, cyclohexane diisocyanate, isophorone diisocyanate, dicyclohexylmethane diisocyanate, or tetramethylxylylene diisocyanate; etc. These polyisocyanates may be used alone, and it is also possible to use two or more kinds together. Among them, it is preferable to use an aromatic polyisocyanate, and it is more preferable to use diphenylmethane diisocyanate and/or xylylene diisocyanate, since excellent reactivity and mechanical properties can be obtained.

A method for producing the hot melt urethane prepolymer (A) may be as follows, for example. The polyol (a1) is added dropwise to a reaction vessel containing the polyisocyanate (a2) and then heated, and they are allowed to react under conditions where the isocyanate groups in the polyisocyanate (a2) are in excess of the hydroxyl groups in the polyol (a1).

In terms of mechanical strength, the equivalence ratio ([NCO/OH]) between the isocyanate groups in the polyisocyanate (a2) and the hydroxyl groups in the polyol (a1) in the production of the hot melt urethane prepolymer (A) is preferably in the range of 1.1 to 5, and more preferably in the range of 1.5 to 3.5.

In terms of mechanical strength, the isocyanate group content of the hot melt urethane prepolymer (A) (hereinafter abbreviated to "NCO %") is preferably in the range of 1.1 to 5 mass %, and more preferably in the range of 1.5 to 4 mass %. Incidentally, the isocyanate group content of the hot melt urethane prepolymer (A) refers to a value measured by potentiometric titration in accordance with JISK1603-1:2007.

The moisture-curable hot melt urethane composition of the present invention contains the hot melt urethane prepolymer (A) and the foaming agent composition (B) as essential components, and may also contain other additives as necessary.

As the other additives, for example, it is possible to use urethanization catalysts, silane coupling agents, thixotropy-imparting agents, antioxidants, plasticizers, fillers, dyes, pigments, waxes, etc. These additives may be used alone, and it is also possible to use two or more kinds together.

Next, the method for producing a foamed and cured product of the moisture-curable hot melt urethane composition will be described.

In the method for producing a foamed and cured product of the moisture-curable hot melt urethane composition of the present invention, it is essential that the hot melt urethane prepolymer (A) having an isocyanate group is heat-melted, then a foaming agent composition (B) containing N,N'-dinitrosopentamethylenetetramine (b1), urea (b2), and a polyol (b3) is mixed with the heat-melted hot melt urethane prepolymer (A), and the mixture is applied to a substrate, followed by a heating treatment at a temperature equal to or higher than the heat-melting temperature of the hot melt urethane prepolymer (A), thereby causing foaming and curing.

The heat-melting temperature of the hot melt urethane prepolymer (A) is in the range of 80 to 120° C., for example.

In the foaming agent composition (B), it is preferable that the (b1) to (b3), preferably as well as the (b4), are stirred and mixed, and the (b1) and (b2), preferably as well as the (b4), are uniformly dispersed in the polyol (b3). In addition, before being mixed with the hot melt urethane prepolymer (A), the foaming agent composition (B) may be warmed at a temperature of 25 to 100° C., for example.

As a method for mixing the foaming agent composition (B) with the heat-melted hot melt urethane prepolymer (A), a method that uses a mixer or the like, such as a batch stirrer, a static mixer, a rotor stator, or a two-component mixer, can be mentioned, for example.

Incidentally, when the hot melt urethane prepolymer (A) and the foaming agent composition (B) are mixed, bubbles may be involved during mixing, or isocyanate groups in the hot melt urethane prepolymer (A) may react with part of the urea (b2) to produce carbon dioxide.

As a method for applying the mixture of (A) and (B) to a substrate, a method that uses an applicator, a roll coater, a spray coater, a T-die coater, a knife coater, a comma coater, or the like can be mentioned, for example.

Incidentally, the applied mixture of (A) and (B) foams upon the post-heating described below and increases in thickness. Accordingly, the thickness at the time of application is preferably determined considering the foaming degree described below and the like.

As the substrate, for example, it is possible to use a nonwoven fabric, a woven fabric, or a knitted fabric made of polyester fibers, nylon fibers, acrylic fibers, polyurethane fibers, acetate fibers, rayon fibers, polylactic acid fibers, cotton, hemp, silk, wool, mixed fibers thereof, or the like; a release paper; etc. Further, as the substrate, it is possible to use a wood substrate such as a plate, MDF (medium density fiberboard), or a particle board; a metal substrate such as aluminum or iron; a plastic substrate such as a polycarbonate substrate, a cycloolefin resin substrate, an acrylic resin substrate, a silicon resin substrate, an epoxy resin substrate, a fluororesin substrate, a polystyrene resin substrate, a polyester resin substrate, a polysulfone resin substrate, a polyarylate resin substrate, a polyvinyl chloride resin substrate, a polyvinylidene chloride substrate, an amorphous polyolefin resin substrate, a polyimide resin substrate, an alicyclic polyimide resin substrate, a cellulose resin substrate, a TAC (triacetylcellulose) substrate, a COP (cycloolefin polymer) substrate, a PC (polycarbonate) substrate, a PBT (polybutylene terephthalate) substrate, a modified PPE (polyphenylene ether) substrate, a PEN (polyethylene naphthalate) substrate, a PET (polyethylene terephthalate) substrate, or a polylactic acid polymer substrate; a glass plate; etc. In addition, the substrate may have a complex-shape part, such as a groove part, an R-shaped part, or an inverted R-shaped part.

After the mixture of (A) and (B) is applied onto the substrate, the above substrate may be further attached onto the applied surface.

Next, the laminate having the substrate and the mixture of (A) and (B) is subjected to a heating treatment at a temperature equal to or higher than the heat-melting temperature of the hot melt urethane prepolymer (A), thereby promoting the foaming and curing of the foaming agent composition (B) (particularly the (b1)). The heating treatment at this time is performed in the range of 100 to 150° C., for example. In terms of ease of suppressing adverse effects on the substrate or deterioration in the properties of the foamed and cured product, the temperature is more preferably in the range of 110 to 140° C. The time of the heating treatment is preferably 1 to 10 minutes, for example.

After the heating treatment, as necessary, post-curing may be performed at a temperature of 20 to 80° C. for 1 to 7 days, for example.

The thickness of the foamed and cured product layer of the moisture-curable hot melt composition obtained by the above method is in the range of 10 to 500 μm, for example. Within this range, an excellent foamed state can be formed. The thickness may be suitably determined according to the intended use of the foamed and cured product. In addition, in the present invention, an excellent foamed state can be maintained even in a thin film, whose thickness is less than 100 μm, for example, preferably in the range of 20 to 90 μm, more preferably in the range of 30 to 80 μm, and particularly preferably in the range of 40 to 70 μm.

The bubbles remaining in the foamed and cured product are mainly formed by foaming upon the post-heating of the (b1). The foaming degree of the foamed and cured product is preferably 1.2 or more, more preferably in the range of 1.5 to 3, and still more preferably in the range of 1.7 to 2.8. Incidentally, the foaming degree of the foamed and cured product refers to a value calculated from the ratio ($V_2/V_1$) between the volume of the mixture of (A) and (B) before foaming ($V_1$) and the volume after foaming ($V_2$).

As described above, in the moisture-curable hot melt urethane composition of the present invention, a specific heat-decomposable foaming agent is used. As a result, a foamed and cured product with excellent texture can be obtained, an excellent foamed state can be maintained even in a thin film, and, even after foaming, no deterioration is caused in the mechanical properties of the foamed and cured product. In addition, foaming can be caused without the influence of water. Thus, even in the case where the moisture-curable hot melt urethane composition is once cooled and solidified from a melted state, or even during moisture curing, by performing a heating treatment again, the foaming of the heat-decomposable foaming agent can be promoted.

Next, the synthetic leather of the present invention will be described.

The synthetic leather of the present invention includes a base fabric (i), an intermediate layer (ii), and a surface skin layer (iii), and the intermediate layer (ii) is a foamed and cured product of the above moisture-curable hot melt urethane composition.

As the base fabric (i), for example, it is possible to use a nonwoven fabric, a woven fabric, or a knitted fabric made of polyester fibers, polyethylene fibers, nylon fibers, acrylic fibers, polyurethane fibers, acetate fibers, rayon fibers, polylactic acid fibers, cotton, hemp, silk, wool, glass fibers, carbon fibers, mixed fibers thereof, or the like, etc.

The surface skin layer (iii) may be formed from a known material by a known method. For example, it is possible to use a solvent-based urethane resin, a water-based urethane resin, a silicone resin, a polypropylene resin, a polyester resin, or the like. As the surface skin layer (iii), in the case where soft texture, bending resistance, and hydrolysis resistance are emphasized, it is preferable to use a polyether-based urethane resin. Among them, in the case where low-temperature flexibility is particularly emphasized, it is more preferable to use a urethane resin obtained using polytetramethylene glycol as a raw material. In addition, in the case where soft texture, heat resistance, and hydrolysis resistance are emphasized, it is preferable to use a urethane resin obtained using a polycarbonate polyol as a raw material. In addition, in order to reduce DMF for environmental responsibility, it is preferable to use a water-based urethane resin.

On the surface skin layer (iii), as necessary, a topcoat layer (iv) may be provided for the purpose of improving the scratch resistance and the like. The topcoat layer (iv) may be formed from a known material by a known method, and the same materials as those usable for forming the surface skin layer (iii) may be used.

Next, the method for producing the synthetic leather of the present invention will be described.

As methods for producing the synthetic leather of the present invention, the following methods can be mentioned, for example:

(a) a method in which the hot melt urethane prepolymer (A) is heat-melted and then mixed with a foaming agent composition (B) containing N,N'-dinitrosopentamethylenetetramine (b1), urea (b2), and a polyol (b3) to give a moisture-curable hot melt urethane composition, the moisture-curable hot melt composition is applied onto a surface skin layer (iii) formed on a release paper, followed by a heating treatment at a temperature equal to or higher than the heat-melting temperature of the hot melt urethane prepolymer (A) to form an intermediate layer (ii), and subsequently a base fabric (i) is attached onto the intermediate layer (ii), thereby producing a synthetic leather;

(b) a method in which the hot melt urethane prepolymer (A) is heat-melted and then mixed with a foaming agent composition (B) containing N,N'-dinitrosopentamethylenetetramine (b1), urea (b2), and a polyol (b3) to give a moisture-curable hot melt urethane composition, the moisture-curable hot melt composition is applied onto a surface skin layer (iii) formed on a release paper, and subsequently a base fabric (i) is attached onto the applied layer of the moisture-curable hot melt composition, followed by a heating treatment at a temperature equal to or higher than the heat-melting temperature of the hot melt urethane prepolymer (A) to form an intermediate layer (ii), thereby producing a synthetic leather;

(c) a method in which the hot melt urethane prepolymer (A) is heat-melted and then mixed with a foaming agent composition (B) containing N,N'-dinitrosopentamethylenetetramine (b1), urea (b2), and a polyol (b3) to give a moisture-curable hot melt urethane composition, the moisture-curable hot melt composition is applied onto a base fabric (i), followed by a heating treatment at a temperature equal to or higher than the heat-melting temperature of the hot melt urethane prepolymer (A) to form an intermediate layer (ii), and subsequently a surface skin layer (iii) side formed on a release paper is attached to the intermediate layer (ii), thereby producing a synthetic leather;

(d) a method in which the hot melt urethane prepolymer (A) is heat-melted and then mixed with a foaming agent composition (B) containing N,N'-dinitrosopentamethylenetetramine (b1), urea (b2), and a polyol (b3) to give a moisture-curable hot melt urethane composition, the moisture-curable hot melt composition is applied onto a base fabric (i), and subsequently a surface skin layer (iii) side formed on a release paper is attached onto the applied layer of the moisture-curable hot melt composition, followed by a heating treatment at a temperature equal to or higher than the heat-melting temperature of the hot melt urethane prepolymer (A) to form an intermediate layer (ii), thereby producing a synthetic leather; etc.

Among them, in terms of the foaming (production) stability of the intermediate layer (ii) and ease of uniformizing the thickness of the intermediate layer (ii), it is preferable to use the production method (b).

The heat-melting temperature of the hot melt urethane prepolymer (A) is in the range of 80 to 120° C., for example.

In the foaming agent composition (B), it is preferable that the (b1) to (b3), preferably as well as the (b4), are stirred and mixed, and the (b1) and (b2), preferably as well as the (b4), are uniformly dispersed in the polyol (b3) using a batch stirrer, a static mixer, a rotor stator, a two-roll mill, a three-roll mill, a bead mill, or the like. In addition, before being mixed with the hot melt urethane prepolymer (A), the foaming agent composition (B) may be warmed at a temperature of 25 to 100° C., for example.

As a method for mixing the foaming agent composition (B) with the heat-melted hot melt urethane prepolymer (A), a method that uses a mixer or the like, such as a batch stirrer, a static mixer, a rotor stator, or a two-component mixer, can be mentioned, for example.

Incidentally, when the hot melt urethane prepolymer (A) and the foaming agent composition (B) are mixed, bubbles may be involved during mixing, or isocyanate groups in the hot melt urethane prepolymer (A) may react with part of the urea (b2) to produce carbon dioxide.

As a method for applying the moisture-curable hot melt urethane composition onto the surface skin layer (iii) formed on a release paper, a method that uses an applicator, a roll coater, a spray coater, a T-die coater, a knife coater, a comma coater, or the like can be mentioned, for example.

Incidentally, the applied moisture-curable hot melt urethane composition foams upon the post-heating described below and increases in thickness. Accordingly, the thickness at the time of application is preferably determined considering the foaming degree described below and the like.

Next, a heating treatment is performed at a temperature equal to or higher than the heat-melting temperature of the hot melt urethane prepolymer (A), thereby promoting the foaming and curing of the foaming agent composition (B) (particularly the (b1)), whereby an intermediate layer (ii) is produced. The heating treatment at this time is performed in the range of 100 to 150° C., for example. In terms of ease of suppressing adverse effects on the substrate or deterioration in the properties of the synthetic leather due to the thermal history, the temperature is more preferably in the range of 110 to 140° C. The time of the heating treatment is preferably 1 to 10 minutes, for example.

After the intermediate layer (ii) is formed, the base fabric (i) is attached onto the intermediate layer (ii), whereby a synthetic leather can be obtained. However, before and/or after attaching the base fabric (i), for the purpose of aging the intermediate layer (ii), post-curing may be performed at a temperature of 20 to 80° C. for 1 to 7 days, for example.

The thickness of the intermediate layer (ii) of the synthetic leather obtained by the above method is in the range of 10 to 500 μm, for example. Within this range, an excellent foamed state can be formed. The thickness may be suitably determined according to the intended use of the synthetic leather of the present invention. In addition, in the present invention, an excellent foamed state can be maintained even in a thin film, whose thickness is less than 100 μm, for example, preferably in the range of 20 to 90 μm, more preferably in the range of 30 to 80 μm, and particularly preferably in the range of 50 to 70 μm.

The bubbles remaining in the intermediate layer (ii) are mainly formed by foaming upon the post-heating of the (b1). The foaming degree of the intermediate layer (ii) is preferably 1.2 or more, more preferably in the range of 1.5 to 3, and still more preferably in the range of 1.7 to 2.8. Incidentally, the foaming degree of the intermediate layer (ii) refers to a value calculated from the ratio ($V_2/V_1$) between the volume of the moisture-curable hot melt urethane composition before foaming ($V_1$) and the volume after foaming ($V_2$).

EXAMPLES

Hereinafter, the present invention will be described in further detail using examples.

[Synthesis Example 1] Synthesis of Hot Melt Urethane Prepolymer (A-1)

In a reaction vessel equipped with a thermometer, a stirrer, an inert gas inlet, and a reflux condenser, 70 parts by mass of polyoxytetramethylene glycol (number average molecular weight: 2,000) and 30 parts by mass of a polyester polyol (1) (reaction product of 1,6-hexanediol and adipic acid, number average molecular weight: 2,000) were charged, and dehydrated under reduced-pressure conditions until the moisture content reached 0.05 mass % or less.

Subsequently, 25 parts by mass of 4,4'-diphenylmethane diisocyanate was added, then the temperature was raised to 100° C., and the mixture was allowed to react for about 3 hours until the isocyanate group content became constant, thereby giving a hot melt urethane prepolymer having an isocyanate group (A-1) having an NCO % of 3.3.

[Synthesis Example 2] Synthesis of Hot Melt Urethane Prepolymer (A-2)

In a reaction vessel equipped with a thermometer, a stirrer, an inert gas inlet, and a reflux condenser, 70 parts by mass of polyoxytetramethylene glycol (number average molecular weight: 2,000) and 30 parts by mass of a polyester polyol (2) (reaction product of a 6-mol propylene oxide adduct of bisphenol A and sebacic acid, number average molecular weight: 2,000) were charged, and dehydrated under reduced-pressure conditions until the moisture content reached 0.05 mass % or less. Subsequently, 25 parts by mass of 4,4'-diphenylmethane diisocyanate was added, then the temperature was raised to 100° C., and the mixture was allowed to react for about 3 hours until the isocyanate group content became constant, thereby giving a hot melt urethane prepolymer having an isocyanate group (A-2) having an NCO % of 3.3.

[Synthesis Example 3] Synthesis of Hot Melt Urethane Prepolymer (A-3)

In a reaction vessel equipped with a thermometer, a stirrer, an inert gas feed port, and a reflux condenser, 70 parts by mass of a polycarbonate polyol ("NIPPORAN 980R" manufactured by Nippon Polyurethane Industry Co., Ltd., number average molecular weight: 2,600) and 30 parts by weight of a polyester polyol (1) (reaction product of 1,6-hexanediol and adipic acid, number average molecular weight: 2,000) were charged, and dehydrated under reduced-pressure conditions until the moisture content reached 0.05 mass % or less. Subsequently, 25 parts by mass of 4,4'-diphenylmethane diisocyanate was added, then the temperature was raised to 100° C., and the mixture was allowed to react for about 3 hours until the isocyanate group content became constant, thereby giving a hot melt urethane prepolymer having an isocyanate group (A-3) having an NCO % of 3.2.

[Synthesis Example 4] Synthesis of Hot Melt Urethane Prepolymer (A-4)

In a reaction vessel equipped with a thermometer, a stirrer, an inert gas inlet, and a reflux condenser, 70 parts by mass of a polycarbonate polyol ("NIPPORAN 980R" manufactured by Nippon Polyurethane Industry Co., Ltd., number average molecular weight: 2,600) and 30 parts by mass of a polyester polyol (2) (reaction product of a 6-mol propylene oxide adduct of bisphenol A and sebacic acid, number average molecular weight: 2,000) were charged, and dehydrated under reduced-pressure conditions until the moisture content reached 0.05 mass % or less.

Subsequently, 25 parts by mass of 4,4'-diphenylmethane diisocyanate was added, then the temperature was raised to 100° C., and the mixture was allowed to react for about 3 hours until the isocyanate group content became constant, thereby giving a hot melt urethane prepolymer having an isocyanate group (A-4) having an NCO % of 3.2.

[Synthesis Example 5] Synthesis of Hot Melt Urethane Prepolymer (A-5)

In a reaction vessel equipped with a thermometer, a stirrer, an inert gas inlet, and a reflux condenser, 70 parts by mass of polyoxytetramethylene glycol (number average molecular weight: 2,000) and 30 parts by mass of a polyester polyol (1) (reaction product of 1,6-hexanediol and adipic acid, number average molecular weight: 2,000) were charged, and dehydrated under reduced-pressure conditions until the moisture content reached 0.05 mass % or less.

Subsequently, 18 parts by mass of xylylene diisocyanate was added, then the temperature was raised to 100° C., and the mixture was allowed to react for about 3 hours until the isocyanate group content became constant, thereby giving a hot melt urethane prepolymer having an isocyanate group (A-5) having an NCO % of 3.2.

[Synthesis Example 6] Synthesis of Hot Melt Urethane Prepolymer (A-6)

In a reaction vessel equipped with a thermometer, a stirrer, an inert gas inlet, and a reflux condenser, 70 parts by mass of a polycarbonate polyol ("NIPPORAN 980R" manufactured by Nippon Polyurethane Industry Co., Ltd., number average molecular weight: 2,600) and 30 parts by mass of a polyester polyol (2) (reaction product of a 6-mol propylene oxide adduct of bisphenol A and sebacic acid, number average molecular weight: 2,000) were charged, and dehydrated under reduced-pressure conditions until the moisture content reached 0.05 mass % or less.

Subsequently, 25 parts by mass of xylylene diisocyanate was added, then the temperature was raised to 100° C., and the mixture was allowed to react for about 3 hours until the isocyanate group content became constant, thereby giving a hot melt urethane prepolymer having an isocyanate group (A-6) having an NCO % of 3.2.

[Synthesis Example 7] Synthesis of Hot Melt Urethane Prepolymer (A-7)

In a reaction vessel equipped with a thermometer, a stirrer, an inert gas inlet, and a reflux condenser, 70 parts by mass of a polycarbonate polyol ("NIPPORAN 980R" manufactured by Nippon Polyurethane Industry Co., Ltd., number average molecular weight: 2,000) and 30 parts by mass of a polyester polyol (2) (reaction product of a 6-mol propylene oxide adduct of bisphenol A and sebacic acid, number average molecular weight: 2,000) were charged, and dehydrated under reduced-pressure conditions until the moisture content reached 0.05 mass % or less.

Subsequently, 25 parts by mass of 4,4'-diphenylmethane diisocyanate was added, then the temperature was raised to 100° C., and the mixture was allowed to react for about 3 hours until the isocyanate group content became constant, thereby giving a hot melt urethane prepolymer having an isocyanate group (A-7) having an NCO % of 3.2.

[Synthesis Example 8] Synthesis of Hot Melt Urethane Prepolymer (A-8)

In a reaction vessel equipped with a thermometer, a stirrer, an inert gas inlet, and a reflux condenser, 70 parts by mass of a polycarbonate polyol ("NIPPORAN 980R" manufactured by Nippon Polyurethane Industry Co., Ltd., number average molecular weight: 2,000) and 30 parts by weight of a polyester polyol (1) (reaction product of 1,6-hexanediol and adipic acid, number average molecular weight: 2,000) were charged, and dehydrated under reduced-pressure conditions until the moisture content reached 0.05 mass % or less.

Subsequently, 18 parts by mass of xylylene diisocyanate was added, then the temperature was raised to 100° C., and the mixture was allowed to react for about 3 hours until the isocyanate group content became constant, thereby giving a hot melt urethane prepolymer having an isocyanate group (A-8) having an NCO % of 3.2.

Example 1

100 parts by mass of the hot melt urethane prepolymer (A-1) was heated to 100° C. to be thereby melted. Subsequently, a foaming agent composition (B-1) obtained by mixing 5 parts by mass of polyoxypropylene triol ("MN-3050" manufactured by Mitsui Chemicals, Inc., number average molecular weight: 3,000), 2.5 parts by mass of N,N'-dinitrosopentamethylenetetramine, and 2.5 parts by mass of urea was mixed with the melted hot melt urethane prepolymer (A-1) and stirred using a batch stirrer.

The mixture was then immediately applied onto a release paper ("ED100K" manufactured by Lintec Corporation) to provide a thickness of 30 μm, and a polyethylene film having a thickness of 20 μm was attached onto the applied surface. They were subjected to a heating treatment at 120° C. for 5 minutes and then allowed to stand for 3 days under the conditions of a temperature of 23° C. and a relative humidity of 65%, thereby giving a foamed and cured product having a thickness of 45 μm.

Examples 2 and 3

Foamed and cured products were obtained in the same manner as in Example 1, except that the thickness of the moisture-curable hot melt urethane composition to be applied was changed as shown in Table 1.

Example 4

100 parts by mass of the hot melt urethane prepolymer (A-1) was heated to 100° C. to be thereby melted. Subsequently, a foaming agent composition (B-2) obtained by mixing 5 parts by mass of polyoxypropylene triol ("T-700" manufactured by Mitsui Chemicals, Inc., number average molecular weight: 700), 2.5 parts by mass of N,N'-dinitrosopentamethylenetetramine, and 2.5 parts by mass of urea was mixed with the melted hot melt urethane prepolymer (A-1) and stirred using a batch stirrer.

The mixture was then immediately applied onto a release paper ("ED100K" manufactured by Lintec Corporation) to provide a thickness of 30 μm, and a polyethylene film having a thickness of 20 μm was attached onto the applied surface. They were subjected to a heating treatment at 120° C. for 5 minutes and then allowed to stand for 3 days under the conditions of a temperature of 23° C. and a relative humidity of 65%, thereby giving a foamed and cured product having a thickness of 50 μm.

Example 5

100 parts by mass of the hot melt urethane prepolymer (A-2) was heated to 100° C. to be thereby melted. Subsequently, a foaming agent composition (B-1) obtained by mixing 5 parts by mass of polyoxypropylene triol ("MN-3050" manufactured by Mitsui Chemicals, Inc., number average molecular weight: 3,000), 2.5 parts by mass of N,N'-dinitrosopentamethylenetetramine, and 2.5 parts by mass of urea was mixed with the melted hot melt urethane prepolymer (A-2) and stirred using a batch stirrer.

The mixture was then immediately applied onto a release paper ("ED100K" manufactured by Lintec Corporation) to provide a thickness of 30 μm, and a polyethylene film having a thickness of 20 μm was attached onto the applied surface. They were subjected to a heating treatment at 120° C. for 5 minutes and then allowed to stand for 3 days under the conditions of a temperature of 23° C. and a relative humidity of 65%, thereby giving a foamed and cured product having a thickness of 50 μm.

Example 6

A foamed and cured product was obtained in the same manner as in Example 5, except that the thickness of the moisture-curable hot melt urethane composition to be applied was changed as shown in Table 2.

Example 7

100 parts by mass of the hot melt urethane prepolymer (A-3) was heated to 100° C. to be thereby melted. Subsequently, a foaming agent composition (B-1) obtained by mixing 5 parts by mass of polyoxypropylene triol ("MN-3050" manufactured by Mitsui Chemicals, Inc., number average molecular weight: 3,000), 2.5 parts by mass of N,N'-dinitrosopentamethylenetetramine, and 2.5 parts by mass of urea was mixed with the melted hot melt urethane prepolymer (A-3) and stirred using a batch stirrer.

The mixture was then immediately applied onto a release paper ("ED100K" manufactured by Lintec Corporation) to provide a thickness of 30 μm, and a polyethylene film having a thickness of 20 μm was attached onto the applied surface. They were subjected to a heating treatment at 120° C. for 5 minutes and then allowed to stand for 3 days under the conditions of a temperature of 23° C. and a relative humidity of 65%, thereby giving a foamed and cured product having a thickness of 45 μm.

Example 8

100 parts by mass of the hot melt urethane prepolymer (A-4) was heated to 100° C. to be thereby melted. Subsequently, a foaming agent composition (B-1) obtained by mixing 5 parts by mass of polyoxypropylene triol ("MN-3050" manufactured by Mitsui Chemicals, Inc., number average molecular weight: 3,000), 2.5 parts by mass of N,N'-dinitrosopentamethylenetetramine, and 2.5 parts by mass of urea was mixed with the melted hot melt urethane prepolymer (A-4) and stirred using a batch stirrer.

The mixture was then immediately applied onto a release paper ("ED100K" manufactured by Lintec Corporation) to provide a thickness of 30 μm, and a polyethylene film having a thickness of 20 μm was attached onto the applied surface. They were subjected to a heating treatment at 120° C. for 5 minutes and then allowed to stand for 3 days under the conditions of a temperature of 23° C. and a relative humidity of 65%, thereby giving a foamed and cured product having a thickness of 50 μm.

Example 9

100 parts by mass of the hot melt urethane prepolymer (A-5) was heated to 100° C. to be thereby melted. Subsequently, a foaming agent composition (B-1) obtained by mixing 5 parts by mass of polyoxypropylene triol ("MN-3050" manufactured by Mitsui Chemicals, Inc., number average molecular weight: 3,000), 2.5 parts by mass of N,N'-dinitrosopentamethylenetetramine, and 2.5 parts by mass of urea was mixed with the melted hot melt urethane prepolymer (A-5) and stirred using a batch stirrer.

The mixture was then immediately applied onto a release paper ("ED100K" manufactured by Lintec Corporation) to provide a thickness of 30 μm, and a polyethylene film having a thickness of 20 μm was attached onto the applied surface. They were subjected to a heating treatment at 120° C. for 5 minutes and then allowed to stand for 3 days under the conditions of a temperature of 23° C. and a relative humidity of 65%, thereby giving a foamed and cured product having a thickness of 45 μm.

Example 10

100 parts by mass of the hot melt urethane prepolymer (A-6) was heated to 100° C. to be thereby melted. Subsequently, a foaming agent composition (B-1) obtained by mixing 5 parts by mass of polyoxypropylene triol ("MN-3050" manufactured by Mitsui Chemicals, Inc., number average molecular weight: 3,000), 2.5 parts by mass of N,N'-dinitrosopentamethylenetetramine, and 2.5 parts by mass of urea was mixed with the melted hot melt urethane prepolymer (A-6) and stirred using a batch stirrer.

The mixture was then immediately applied onto a release paper ("ED100K" manufactured by Lintec Corporation) to provide a thickness of 30 μm, and a polyethylene film having a thickness of 20 μm was attached onto the applied surface. They were subjected to a heating treatment at 120° C. for 5 minutes and then allowed to stand for 3 days under the conditions of a temperature of 23° C. and a relative humidity of 65%, thereby giving a foamed and cured product having a thickness of 50 μm.

Example 11

100 parts by mass of the hot melt urethane prepolymer (A-1) was heated to 100° C. to be thereby melted. Subsequently, a foaming agent composition (B-3) obtained by mixing 5 parts by mass of polyoxypropylene triol ("MN-3050" manufactured by Mitsui Chemicals, Inc., number average molecular weight: 3,000), 1.5 parts by mass of N,N'-dinitrosopentamethylenetetramine, and 3.5 parts by mass of urea was mixed with the melted hot melt urethane prepolymer (A-1) and stirred using a batch stirrer.

The mixture was then immediately applied onto a release paper ("ED100K" manufactured by Lintec Corporation) to provide a thickness of 30 μm, and a polyethylene film having a thickness of 20 μm was attached onto the applied surface. They were subjected to a heating treatment at 120° C. for 5 minutes and then allowed to stand for 3 days under the conditions of a temperature of 23° C. and a relative humidity of 65%, thereby giving a foamed and cured product having a thickness of 50 μm.

Example 12

100 parts by mass of the hot melt urethane prepolymer (A-1) was heated to 100° C. to be thereby melted. Subsequently, a foaming agent composition (B-4) obtained by mixing 5 parts by mass of polyoxypropylene triol ("MN-3050" manufactured by Mitsui Chemicals, Inc., number average molecular weight: 3,000), 3.5 parts by mass of N,N'-dinitrosopentamethylenetetramine, and 1.5 parts by mass of urea was mixed with the melted hot melt urethane prepolymer (A-1) and stirred using a batch stirrer.

The mixture was then immediately applied onto a release paper ("ED100K" manufactured by Lintec Corporation) to provide a thickness of 30 μm, and a polyethylene film having a thickness of 20 μm was attached onto the applied surface. They were subjected to a heating treatment at 120° C. for 5 minutes and then allowed to stand for 3 days under the conditions of a temperature of 23° C. and a relative humidity of 65%, thereby giving a foamed and cured product having a thickness of 45 μm.

Example 13

100 parts by mass of the hot melt urethane prepolymer (A-1) was heated to 100° C. to be thereby melted. Subsequently, a foaming agent composition (B-5) obtained by mixing 10 parts by mass of polyoxypropylene triol ("MN-3050" manufactured by Mitsui Chemicals, Inc., number average molecular weight: 3,000), 5 parts by mass of N,N'-dinitrosopentamethylenetetramine, and 5 parts by mass of urea was mixed with the melted hot melt urethane prepolymer (A-1) and stirred using a batch stirrer.

The mixture was then immediately applied onto a release paper ("ED100K" manufactured by Lintec Corporation) to provide a thickness of 30 μm, and a polyethylene film having a thickness of 20 μm was attached onto the applied surface. They were subjected to a heating treatment at 120° C. for 5 minutes and then allowed to stand for 3 days under the conditions of a temperature of 23° C. and a relative humidity of 65%, thereby giving a foamed and cured product having a thickness of 50 μm.

Example 14

100 parts by mass of the hot melt urethane prepolymer (A-1) was heated to 100° C. to be thereby melted. Subsequently, a foaming agent composition (B-1) obtained by mixing 5 parts by mass of polyoxypropylene triol ("MN-3050" manufactured by Mitsui Chemicals, Inc., number average molecular weight: 3,000), 2.5 parts by mass of N,N'-dinitrosopentamethylenetetramine, and 2.5 parts by mass of urea was mixed with the melted hot melt urethane prepolymer (A-1) and stirred using a batch stirrer.

The mixture was then immediately applied onto a release paper ("ED100K" manufactured by Lintec Corporation) to provide a thickness of 30 μm, and a polyethylene film having a thickness of 20 μm was attached onto the applied surface. They were subjected to a heating treatment at 140° C. for 5 minutes and then allowed to stand for 3 days under the conditions of a temperature of 23° C. and a relative humidity of 65%, thereby giving a foamed and cured product having a thickness of 55 μm.

Example 15

100 parts by mass of the hot melt urethane prepolymer (A-1) was heated to 100° C. to be thereby melted. Subsequently, a foaming agent composition (B-6) obtained by mixing 5 parts by mass of polyoxypropylene triol ("MN-3050" manufactured by Mitsui Chemicals, Inc., number average molecular weight: 3,000), 2.5 parts by mass of N,N'-dinitrosopentamethylenetetramine, 2.5 parts by mass of urea, and 0.5 parts by mass of boric acid was mixed with the melted hot melt urethane prepolymer (A-1) and stirred using a batch stirrer.

The mixture was then immediately applied onto a release paper ("ED100K" manufactured by Lintec Corporation) to provide a thickness of 30 μm, and a polyethylene film having a thickness of 20 μm was attached onto the applied surface. They were subjected to a heating treatment at 120° C. for 5 minutes and then allowed to stand for 3 days under the conditions of a temperature of 23° C. and a relative humidity of 65%, thereby giving a foamed and cured product having a thickness of 50 μm.

Examples 16 and 17

Foamed and cured products were obtained in the same manner as in Example 1, except that the thickness of the moisture-curable hot melt urethane composition to be applied was changed as shown in Table 1.

Example 18

100 parts by mass of the hot melt urethane prepolymer (A-1) was heated to 100° C. to be thereby melted. Subsequently, a foaming agent composition (B-7) obtained by mixing 5 parts by mass of polyoxypropylene triol ("T-700" manufactured by Mitsui Chemicals, Inc., number average molecular weight: 700), 2.5 parts by mass of N,N'-dinitrosopentamethylenetetramine, 2.5 parts by mass of urea, and 0.5 parts by mass of boric acid was mixed with the melted hot melt urethane prepolymer (A-1) and stirred using a batch stirrer.

The mixture was then immediately applied onto a release paper ("ED100K" manufactured by Lintec Corporation) to provide a thickness of 30 μm, and a polyethylene film having a thickness of 20 μm was attached onto the applied surface. They were subjected to a heating treatment at 120° C. for 5 minutes and then allowed to stand for 3 days under the conditions of a temperature of 23° C. and a relative humidity of 65%, thereby giving a foamed and cured product having a thickness of 55 μm.

Example 19

100 parts by mass of the hot melt urethane prepolymer (A-2) was heated to 100° C. to be thereby melted. Subsequently, a foaming agent composition (B-6) obtained by mixing 5 parts by mass of polyoxypropylene triol ("MN-3050" manufactured by Mitsui Chemicals, Inc., number average molecular weight: 3,000), 2.5 parts by mass of N,N'-dinitrosopentamethylenetetramine, 2.5 parts by mass of urea, and 0.5 parts by mass of boric acid was mixed with the melted hot melt urethane prepolymer (A-2) and stirred using a batch stirrer.

The mixture was then immediately applied onto a release paper ("ED100K" manufactured by Lintec Corporation) to provide a thickness of 30 μm, and a polyethylene film having a thickness of 20 μm was attached onto the applied surface. They were subjected to a heating treatment at 120° C. for 5 minutes and then allowed to stand for 3 days under the conditions of a temperature of 23° C. and a relative humidity of 65%, thereby giving a foamed and cured product having a thickness of 55 μm.

Example 20

A foamed and cured product was obtained in the same manner as in Example 5, except that the thickness of the moisture-curable hot melt urethane composition to be applied was changed as shown in Table 2.

Example 21

100 parts by mass of the hot melt urethane prepolymer (A-3) was heated to 100° C. to be thereby melted. Subsequently, a foaming agent composition (B-6) obtained by mixing 5 parts by mass of polyoxypropylene triol ("MN-3050" manufactured by Mitsui Chemicals, Inc., number average molecular weight: 3,000), 2.5 parts by mass of N,N'-dinitrosopentamethylenetetramine, 2.5 parts by mass of urea, and 0.5 parts by mass of boric acid was mixed with the melted hot melt urethane prepolymer (A-3) and stirred using a batch stirrer.

The mixture was then immediately applied onto a release paper ("ED100K" manufactured by Lintec Corporation) to provide a thickness of 30 μm, and a polyethylene film having a thickness of 20 μm was attached onto the applied surface. They were subjected to a heating treatment at 120° C. for 5 minutes and then allowed to stand for 3 days under the conditions of a temperature of 23° C. and a relative humidity of 65%, thereby giving a foamed and cured product having a thickness of 50 μm.

Example 22

100 parts by mass of the hot melt urethane prepolymer (A-4) was heated to 100° C. to be thereby melted. Subsequently, a foaming agent composition (B-6) obtained by mixing 5 parts by mass of polyoxypropylene triol ("MN-3050" manufactured by Mitsui Chemicals, Inc., number average molecular weight: 3,000), 2.5 parts by mass of N,N'-dinitrosopentamethylenetetramine, 2.5 parts by mass of urea, and 0.5 parts by mass of boric acid was mixed with the melted hot melt urethane prepolymer (A-4) and stirred using a batch stirrer.

The mixture was then immediately applied onto a release paper ("ED100K" manufactured by Lintec Corporation) to provide a thickness of 30 μm, and a polyethylene film having a thickness of 20 μm was attached onto the applied surface. They were subjected to a heating treatment at 120° C. for 5 minutes and then allowed to stand for 3 days under the conditions of a temperature of 23° C. and a relative humidity of 65%, thereby giving a foamed and cured product having a thickness of 55 μm.

Example 23

100 parts by mass of the hot melt urethane prepolymer (A-5) was heated to 100° C. to be thereby melted. Subsequently, a foaming agent composition (B-6) obtained by mixing 5 parts by mass of polyoxypropylene triol ("MN-3050" manufactured by Mitsui Chemicals, Inc., number average molecular weight: 3,000), 2.5 parts by mass of N,N'-dinitrosopentamethylenetetramine, 2.5 parts by mass of urea, and 0.5 parts by mass of boric acid was mixed with the melted hot melt urethane prepolymer (A-5) and stirred using a batch stirrer.

The mixture was then immediately applied onto a release paper ("ED100K" manufactured by Lintec Corporation) to provide a thickness of 30 μm, and a polyethylene film having a thickness of 20 μm was attached onto the applied surface. They were subjected to a heating treatment at 120° C. for 5 minutes and then allowed to stand for 3 days under the conditions of a temperature of 23° C. and a relative humidity of 65%, thereby giving a foamed and cured product having a thickness of 50 μm.

Example 24

100 parts by mass of the hot melt urethane prepolymer (A-6) was heated to 100° C. to be thereby melted. Subsequently, a foaming agent composition (B-6) obtained by mixing 5 parts by mass of polyoxypropylene triol ("MN-3050" manufactured by Mitsui Chemicals, Inc., number average molecular weight: 3,000), 2.5 parts by mass of N,N'-dinitrosopentamethylenetetramine, 2.5 parts by mass of urea, and 0.5 parts by mass of boric acid was mixed with the melted hot melt urethane prepolymer (A-6) and stirred using a batch stirrer.

The mixture was then immediately applied onto a release paper ("ED100K" manufactured by Lintec Corporation) to provide a thickness of 30 μm, and a polyethylene film having a thickness of 20 μm was attached onto the applied surface. They were subjected to a heating treatment at 120° C. for 5 minutes and then allowed to stand for 3 days under the conditions of a temperature of 23° C. and a relative humidity of 65%, thereby giving a foamed and cured product having a thickness of 52 μm.

Example 25

100 parts by mass of the hot melt urethane prepolymer (A-1) was heated to 100° C. to be thereby melted. Subsequently, a foaming agent composition (B-8) obtained by mixing 5 parts by mass of polyoxypropylene triol ("MN-3050" manufactured by Mitsui Chemicals, Inc., number average molecular weight: 3,000), 1.5 parts by mass of N,N'-dinitrosopentamethylenetetramine, 3.5 parts by mass of urea, and 0.5 parts by mass of boric acid was mixed with the melted hot melt urethane prepolymer (A-1) and stirred using a batch stirrer.

The mixture was then immediately applied onto a release paper ("ED100K" manufactured by Lintec Corporation) to provide a thickness of 30 μm, and a polyethylene film having a thickness of 20 μm was attached onto the applied surface. They were subjected to a heating treatment at 120° C. for 5 minutes and then allowed to stand for 3 days under the conditions of a temperature of 23° C. and a relative humidity of 65%, thereby giving a foamed and cured product having a thickness of 55 μm.

Example 26

100 parts by mass of the hot melt urethane prepolymer (A-1) was heated to 100° C. to be thereby melted. Subsequently, a foaming agent composition (B-9) obtained by mixing 5 parts by mass of polyoxypropylene triol ("MN-3050" manufactured by Mitsui Chemicals, Inc., number average molecular weight: 3,000), 3.5 parts by mass of N,N'-dinitrosopentamethylenetetramine, 1.5 parts by mass of urea, and 0.5 parts by mass of boric acid was mixed with the melted hot melt urethane prepolymer (A-1) and stirred using a batch stirrer.

The mixture was then immediately applied onto a release paper ("ED100K" manufactured by Lintec Corporation) to provide a thickness of 30 μm, and a polyethylene film having a thickness of 20 μm was attached onto the applied surface. They were subjected to a heating treatment at 120° C. for 5 minutes and then allowed to stand for 3 days under the

Example 27

100 parts by mass of the hot melt urethane prepolymer (A-1) was heated to 100° C. to be thereby melted. Subsequently, a foaming agent composition (B-10) obtained by mixing 10 parts by mass of polyoxypropylene triol ("MN-3050" manufactured by Mitsui Chemicals, Inc., number average molecular weight: 3,000), 5 parts by mass of N,N'-dinitrosopentamethylenetetramine, 5 parts by mass of urea, and 1.0 parts by mass of boric acid was mixed with the melted hot melt urethane prepolymer (A-1) and stirred using a batch stirrer.

The mixture was then immediately applied onto a release paper ("ED100K" manufactured by Lintec Corporation) to provide a thickness of 30 μm, and a polyethylene film having a thickness of 20 μm was attached onto the applied surface. They were subjected to a heating treatment at 120° C. for 5 minutes and then allowed to stand for 3 days under the conditions of a temperature of 23° C. and a relative humidity of 65%, thereby giving a foamed and cured product having a thickness of 58 μm.

Example 28

100 parts by mass of the hot melt urethane prepolymer (A-1) was heated to 100° C. to be thereby melted. Subsequently, a foaming agent composition (B-6) obtained by mixing 5 parts by mass of polyoxypropylene triol ("MN-3050" manufactured by Mitsui Chemicals, Inc., number average molecular weight: 3,000), 2.5 parts by mass of N,N'-dinitrosopentamethylenetetramine, 2.5 parts by mass of urea, and 0.5 parts by mass of boric acid was mixed with the melted hot melt urethane prepolymer (A-1) and stirred using a batch stirrer.

The mixture was then immediately applied onto a release paper ("ED100K" manufactured by Lintec Corporation) to provide a thickness of 30 μm, and a polyethylene film having a thickness of 20 μm was attached onto the applied surface. They were subjected to a heating treatment at 140° C. for 5 minutes and then allowed to stand for 3 days under the conditions of a temperature of 23° C. and a relative humidity of 65%, thereby giving a foamed and cured product having a thickness of 60 μm.

Example 29

100 parts by mass of the hot melt urethane prepolymer (A-1) was heated to 100° C. to be thereby melted. Subsequently, a foaming agent composition (B-11) obtained by mixing 5 parts by mass of polyoxypropylene triol ("MN-3050" manufactured by Mitsui Chemicals, Inc., number average molecular weight: 3,000), 2.5 parts by mass of N,N'-dinitrosopentamethylenetetramine, 2.5 parts by mass of urea, and 2.5 parts by mass of boric acid was mixed with the melted hot melt urethane prepolymer (A-1) and stirred using a batch stirrer.

The mixture was then immediately applied onto a release paper ("ED100K" manufactured by Lintec Corporation) to provide a thickness of 30 μm, and a polyethylene film having a thickness of 20 μm was attached onto the applied surface. They were subjected to a heating treatment at 120° C. for 5 minutes and then allowed to stand for 3 days under the conditions of a temperature of 23° C. and a relative humidity of 65%, thereby giving a foamed and cured product having a thickness of 60 μm.

Comparative Example 1

100 parts by mass of the hot melt urethane prepolymer (A-1) was heated to 100° C. to be thereby melted. Subsequently, a water-foamed composition (X-1) obtained by mixing 0.5 parts by mass of ethylene glycol, 0.1 parts by mass of N,N-dimethylcyclohexylamine, and 0.1 parts of water was mixed with the melted hot melt urethane prepolymer (A-1) and stirred using a batch stirrer.

The mixture was then immediately applied onto a release paper ("ED100K" manufactured by Lintec Corporation) to provide a thickness of 30 μm, and a polyethylene film having a thickness of 20 μm was attached onto the applied surface. They were then allowed to stand for 5 days under the conditions of a temperature of 23° C. and a relative humidity of 65%, thereby giving a foamed and cured product having a thickness of 32 μm.

Comparative Example 2

100 parts by mass of the hot melt urethane prepolymer (A-1) was heated to 100° C. to be thereby melted. Subsequently, a foaming agent composition (B'-1) obtained by mixing 5 parts by mass of polyoxypropylene triol ("MN-3050" manufactured by Mitsui Chemicals, Inc., number average molecular weight: 3,000) and 2 parts by mass of N,N'-dinitrosopentamethylenetetramine was mixed with the melted hot melt urethane prepolymer (A-1) and stirred using a batch stirrer.

The mixture was then immediately applied onto a release paper ("ED100K" manufactured by Lintec Corporation) to provide a thickness of 30 μm, and a polyethylene film having a thickness of 20 μm was attached onto the applied surface. They were subjected to a heating treatment at 120° C. for 5 minutes and then allowed to stand for 3 days under the conditions of a temperature of 23° C. and a relative humidity of 65%, thereby giving a foamed and cured product having a thickness of 40 μm.

Comparative Example 3

100 parts by mass of the hot melt urethane prepolymer (A-1) was heated to 100° C. to be thereby melted. Subsequently, a foaming agent composition (B'-2) obtained by mixing 5 parts by mass of polyoxypropylene triol ("MN-3050" manufactured by Mitsui Chemicals, Inc., number average molecular weight: 3,000) and 2 parts by mass of urea was mixed with the melted hot melt urethane prepolymer (A-1) and stirred using a batch stirrer.

The mixture was then immediately applied onto a release paper ("ED100K" manufactured by Lintec Corporation) to provide a thickness of 30 μm, and a polyethylene film having a thickness of 20 μm was attached onto the applied surface. They were subjected to a heating treatment at 120° C. for 5 minutes and then allowed to stand for 3 days under the conditions of a temperature of 23° C. and a relative humidity of 65%, thereby giving a foamed and cured product having a thickness of 35 μm.

Comparative Example 4

100 parts by mass of the hot melt urethane prepolymer (A-1) was heated to 100° C. to be thereby melted. Subsequently, a foaming agent composition (B'-3) obtained by mixing 5 parts by mass of polyoxypropylene triol ("MN-3050" manufactured by Mitsui Chemicals, Inc., number average molecular weight: 3,000), 2.5 parts by mass of azodicarbonamide, and 2.5 parts by mass of urea was mixed with the melted hot melt urethane prepolymer (A-1) and stirred using a batch stirrer.

The mixture was then immediately applied onto a release paper ("ED100K" manufactured by Lintec Corporation) to provide a thickness of 30 μm, and a polyethylene film having a thickness of 20 μm was attached onto the applied surface. They were subjected to a heating treatment at 120° C. for 5 minutes and then allowed to stand for 3 days under the conditions of a temperature of 23° C. and a relative humidity of 65%, thereby giving a foamed and cured product having a thickness of 32 μm.

Comparative Example 5

100 parts by mass of the hot melt urethane prepolymer (A-1) was heated to 100° C. to be thereby melted. Subsequently, a foaming agent composition (B'-4) obtained by mixing 5 parts by mass of polyoxypropylene triol ("MN-3050" manufactured by Mitsui Chemicals, Inc., number average molecular weight: 3,000), 2.5 parts by mass of 4,4'-oxybis(benzenesulfonyl hydrazide), and 2.5 parts by mass of urea was mixed with the melted hot melt urethane prepolymer (A-1) and stirred using a batch stirrer.

The mixture was then immediately applied onto a release paper ("ED100K" manufactured by Lintec Corporation) to provide a thickness of 30 μm, and a polyethylene film having a thickness of 20 μm was attached onto the applied surface. They were subjected to a heating treatment at 120° C. for 5 minutes and then allowed to stand for 3 days under the conditions of a temperature of 23° C. and a relative humidity of 65%, thereby giving a foamed and cured product having a thickness of 33 μm.

Comparative Example 6

100 parts by mass of the hot melt urethane prepolymer (A-1) was heated to 100° C. to be thereby melted. Subsequently, a foaming agent composition (B'-5) obtained by mixing 5 parts by mass of polyoxypropylene triol ("MN-3050" manufactured by Mitsui Chemicals, Inc., number average molecular weight: 3,000), 2.5 parts by mass of sodium hydrogen carbonate, and 2.5 parts by mass of urea was mixed with the melted hot melt urethane prepolymer (A-1) and stirred using a batch stirrer.

The mixture was then immediately applied onto a release paper ("ED100K" manufactured by Lintec Corporation) to provide a thickness of 30 μm, and a polyethylene film having a thickness of 20 μm was attached onto the applied surface. They were subjected to a heating treatment at 120° C. for 5 minutes and then allowed to stand for 3 days under the conditions of a temperature of 23° C. and a relative humidity of 65%, thereby giving a foamed and cured product having a thickness of 32 μm.

[Measurement Method for Melt Viscosity]

The hot melt urethane prepolymers (A-1) to (A-8) were each melted at 100° C. for 1 hour, then 1 ml was sampled, and the melt viscosity at 100° C. was measured using a cone-plate viscometer (Digital Cone Viscometer "CV-1S, RT Type" manufactured by MST Engineering Co., Ltd., 40P cone, rotor speed: 50 rpm).

[Measurement Method for Foaming Degree of Foamed and Cured Product]

In the examples and comparative examples, the volume ($V_1$) immediately after adding the melted hot melt urethane prepolymer (A) and the foaming agent composition (B) or water-foamed composition (X) and the volume ($V_2$) of the cured product after foaming were measured, and the foaming degree was calculated from their ratio ($V_2/V_1$).

[Evaluation Method for Foamed State]

The foamed and cured products and cured products obtained in the examples and comparative examples were observed using a scanning electron microscope "SU3500" manufactured by Hitachi High-Technologies Corporation (magnification: 200) and evaluated as follows.

"A": Excellent foamed state can be confirmed.
"B": Excellent foamed state cannot be confirmed.

[Evaluation Method for Texture]

The textures of the foamed and cured products and cured products obtained in the examples and comparative examples were evaluated based on the tactile impression.

"A": Extremely high flexibility, and no asperities are confirmed.
"B": Good flexibility, and no asperities are confirmed.
"C": Hard, or asperities are confirmed.

[Evaluation Method for Mechanical Properties]

The foamed and cured products and cured products obtained in the examples and comparative examples were each cut into a specimen 100 mm in length and 5 mm in width. Each end of the specimen was held in a chuck. Using a tensile tester "Autograph AG-I" (manufactured by Shimadzu Corporation Co., Ltd.), the specimen was pulled in an atmosphere having a temperature of 23° C. and a humidity of 60% at a crosshead speed of 300 mm/min, and the 100% modulus (MPa), 200% modulus (MPa), stress at break (MPa), and elongation at break (%) of the specimen were measured. The gauge length at this time was 20 mm, and the initial distance between chucks was 20 mm. Incidentally, specimens that were not able to be pulled and evaluated are indicated with "-".

TABLE 1

| | | Example 1 | Example 2 | Example 3 | Example 4 | Example 5 | Example 6 | Example 7 |
|---|---|---|---|---|---|---|---|---|
| Urethane prepolymer having isocyanate group (A) | Polyol (a1) | (A-1) | (A-1) | (A-1) | (A-1) | (A-2) | (A-2) | (A-3) |
| | PTMG (parts by mass) | 70 | 70 | 70 | 70 | 70 | 70 | |
| | PC (parts by mass) | | | | | | | 70 |
| | PEs (1) (parts by mass) | 30 | 30 | 30 | 30 | | | 30 |
| | PEs (2) (parts by mass) | | | | | 30 | 30 | |
| | Polyisocyanate (a2) | | | | | | | |
| | MDI (parts by mass) | 25 | 25 | 25 | 25 | 25 | 25 | 25 |
| | NCO % (%) | 3.3 | 3.3 | 3.3 | 3.3 | 3.3 | 3.3 | 3.2 |
| | Melting temperature (° C.) | 100 | 100 | 100 | 100 | 100 | 100 | 100 |
| | Melt viscosity at 100° C. (mPa·s) | 2000 | 2000 | 2000 | 2000 | 3000 | 3000 | 2500 |

TABLE 1-continued

|  |  | Example 1 | Example 2 | Example 3 | Example 4 | Example 5 | Example 6 | Example 7 |
|---|---|---|---|---|---|---|---|---|
| Foaming agent composition (B) |  | (B-1) | (B-1) | (B-1) | (B-2) | (B-1) | (B-1) | (B-1) |
|  | N,N'-Dinitrosopentamethylenetetramine (b1) (parts by mass) | 2.5 | 2.5 | 2.5 | 2.5 | 2.5 | 2.5 | 2.5 |
|  | Urea (b2) (parts by mass) | 2.5 | 2.5 | 2.5 | 2.5 | 2.5 | 2.5 | 2.5 |
|  | Polyol (b3) (parts by mass) |  |  |  |  |  |  |  |
|  | MN3050 (parts by mass) | 5 | 5 | 5 |  | 5 | 5 | 5 |
|  | T700 (parts by mass) |  |  |  | 5 |  |  |  |
|  | Mass ratio (b1)/(b2) | 50/50 | 50/50 | 50/50 | 50/50 | 50/50 | 50/50 | 50/50 |
| Amount of foaming agent composition used per 100 parts by mass of (A)(parts by mass) |  | 10 | 10 | 10 | 10 | 10 | 10 | 10 |
| Post-heating temperature (° C.) |  | 120 | 120 | 120 | 120 | 120 | 120 | 120 |
| Thickness of mixture applied (μm) |  | 30 | 50 | 100 | 30 | 30 | 50 | 30 |
| Thickness of foamed and cured product (μm) |  | 45 | 100 | 200 | 50 | 50 | 110 | 45 |
| Foaming degree of foamed and cured product |  | 1.8 | 2 | 2.2 | 1.7 | 1.8 | 2 | 1.8 |
| Evaluation of foamed state |  | A | A | A | A | A | A | A |
| Evaluation of texture |  | B | B | B | B | B | B | B |
| Evaluation of mechanical properties |  |  |  |  |  |  |  |  |
| 100% Modulus (MPa) |  | 0.4 | 0.6 | 1.2 | 0.5 | 0.3 | 0.5 | 0.8 |
| 200% Modulus (MPa) |  | 0.8 | 1.2 | 2.4 | 0.9 | 0.6 | 0.8 | 1.2 |
| Stress at break (MPa) |  | 3.0 | 4.0 | 8.0 | 3.5 | 2.8 | 3.0 | 3.8 |
| Elongation at break (%) |  | 600 | 580 | 550 | 620 | 680 | 650 | 600 |
| Stress at break (MPa) |  | 2.2 | 2.4 | 3.5 | 2.4 | 2.1 | 2.5 | 2.1 |
| Elongation at break (%) |  | 670 | 680 | 750 | 690 | 670 | 700 | 650 |

TABLE 2

|  |  | Example 8 | Example 9 | Example 10 | Example 11 | Example 12 | Example 13 | Example 14 |
|---|---|---|---|---|---|---|---|---|
| Urethane prepolymer having isocyanate group (A) |  | (A-5) | (A-5) | (A-6) | (A-1) | (A-1) | (A-1) | (A-1) |
|  | Polyol (a1) |  |  |  |  |  |  |  |
|  | PTMG (parts by mass) |  | 70 |  | 70 | 70 | 70 | 70 |
|  | PC (parts by mass) | 70 |  | 70 |  |  |  |  |
|  | PEs (1) (parts by mass) |  | 30 |  | 30 | 30 | 30 | 30 |
|  | PEs (2) (parts by mass) | 30 |  | 30 |  |  |  |  |
|  | Polyisocyanate (a2) |  |  |  |  |  |  |  |
|  | MDI (parts by mass) | 25 |  |  | 25 | 25 | 25 | 25 |
|  | XDI (parts by mass) |  | 18 | 18 |  |  |  |  |
|  | NCO % (%) | 3.2 | 3.2 | 3.2 | 3.3 | 3.3 | 3.3 | 3.3 |
|  | Melting temperature (° C.) | 100 | 100 | 100 | 100 | 100 | 100 | 100 |
|  | Melt viscosity at 100° C. (mPa·s) | 3500 | 2200 | 2300 | 2000 | 2000 | 2000 | 2000 |
| Foaming agent composition (B) |  | (B-1) | (B-1) | (B-1) | (B-3) | (B-4) | (B-5) | (B-1) |
|  | N,N'-Dinitrosopentamethylenetetramine (b1) (parts by mass) | 2.5 | 2.5 | 2.5 | 1.5 | 3.5 | 5 | 2.5 |
|  | Urea (b2) (parts by mass) | 2.5 | 2.5 | 2.5 | 3.5 | 1.5 | 5 | 2.5 |
|  | Polyol (b3) (parts by mass) |  |  |  |  |  |  |  |
|  | MN3050 (parts by mass) | 5 | 5 | 5 | 5 | 5 | 10 | 5 |
|  | Mass ratio (b1)/(b2) | 50/50 | 50/50 | 50/50 | 30/70 | 70/30 | 50/50 | 50/50 |
| Amount of foaming agent composition used per 100 parts by mass of (A)(parts by mass) |  | 10 | 10 | 10 | 10 | 10 | 20 | 10 |
| Post-heating temperature (° C.) |  | 120 | 120 | 120 | 120 | 120 | 120 | 140 |
| Thickness of mixture applied (μm) |  | 30 | 30 | 30 | 30 | 30 | 30 | 30 |
| Thickness of foamed and cured product (μm) |  | 45 | 45 | 50 | 50 | 45 | 50 | 55 |
| Foaming degree of foamed and cured product |  | 1.9 | 1.8 | 1.7 | 1.7 | 2.2 | 2 | 2.5 |
| Evaluation of foamed state |  | A | A | A | A | A | A | A |
| Evaluation of texture |  | B | B | B | B | B | B | B |
| Evaluation of mechanical properties |  |  |  |  |  |  |  |  |
| 100% Modulus (MPa) |  | 0.7 | 0.5 | 0.6 | 0.8 | 0.4 | 1.8 | 0.3 |
| 200% Modulus (MPa) |  | 1.0 | 1.0 | 1.2 | 1.5 | 0.8 | 3.5 | 0.7 |
| Stress at break (MPa) |  | 4.0 | 3.0 | 3.5 | 4.5 | 3.5 | 8.0 | 3.0 |
| Elongation at break (%) |  | 670 | 580 | 600 | 550 | 680 | 620 | 620 |

TABLE 3

|  |  | Example 15 | Example 16 | Example 17 | Example 18 | Example 19 | Example 20 | Example 21 |
|---|---|---|---|---|---|---|---|---|
| Urethane prepolymer having isocyanate group (A) |  | (A-1) | (A-1) | (A-1) | (A-1) | (A-2) | (A-2) | (A-3) |
| | Polyol (a1) | | | | | | | |
| | PTMG (parts by mass) | 70 | 70 | 70 | 70 | 70 | 70 | |
| | PC (parts by mass) | | | | | | | 70 |
| | PEs (1) (parts by mass) | 30 | 30 | 30 | 30 | | | 30 |
| | PEs (2) (parts by mass) | | | | | 30 | 30 | |
| | Polyisocyanate (a2) | | | | | | | |
| | MDI (parts by mass) | 25 | 25 | 25 | 25 | 25 | 25 | 25 |
| | NCO % (%) | 3.3 | 3.3 | 3.3 | 3.3 | 3.3 | 3.3 | 3.2 |
| | Melting temperature (° C.) | 100 | 100 | 100 | 100 | 100 | 100 | 100 |
| | Melt viscosity at 100° C. (mPa · s) | 2000 | 2000 | 2000 | 2000 | 3000 | 3000 | 2500 |
| Foaming agent composition (B) |  | (B-6) | (B-6) | (B-6) | (B-7) | (B-6) | (B-6) | (B-6) |
| | N,N'-Dinitrosopentamethylenetetramine (b1) (parts by mass) | 2.5 | 2.5 | 2.5 | 2.5 | 2.5 | 2.5 | 2.5 |
| | Urea (b2) (parts by mass) | 2.5 | 2.5 | 2.5 | 2.5 | 2.5 | 2.5 | 2.5 |
| | Boric acid (b4) (parts by mass) | 0.5 | 0.5 | 0.5 | 0.5 | 0.5 | 0.5 | 0.5 |
| | Polyol (b3) (parts by mass) | | | | | | | |
| | MN3050 (parts by mass) | 5 | 5 | 5 | | 5 | 5 | 5 |
| | T700 (parts by mass) | | | | 5 | | | |
| | Mass ratio (b1)/(b2) | 50/50 | 50/50 | 50/50 | 50/50 | 50/50 | 50/50 | 50/50 |
| | Amount of (b4) used per 100 parts by mass of (b2) | 20 | 20 | 20 | 20 | 20 | 20 | 20 |
| Amount of foaming agent composition used per 100 parts by mass of (A)(parts by mass) | | 10.5 | 10.5 | 10.5 | 10.5 | 10.5 | 10.5 | 10.5 |
| Post-heating temperature (° C.) | | 120 | 120 | 120 | 120 | 120 | 120 | 120 |
| Thickness of mixture applied (μm) | | 30 | 50 | 100 | 30 | 30 | 50 | 30 |
| Thickness of foamed and cured product (μm) | | 50 | 120 | 220 | 55 | 55 | 130 | 50 |
| Foaming degree of foamed and cured product | | 2.1 | 2.4 | 2.6 | 2.1 | 2.2 | 2.3 | 2.2 |
| Evaluation of foamed state | | A | A | A | A | A | A | A |
| Evaluation of texture | | A | A | A | A | A | A | A |
| Evaluation of mechanical properties | | | | | | | | |
| 100% Modulus (MPa) | | 0.2 | 0.3 | 0.4 | 0.3 | 0.2 | 0.3 | 0.4 |
| 200% Modulus (MPa) | | 0.5 | 0.6 | 0.8 | 0.6 | 0.4 | 0.6 | 0.8 |
| Stress at break (MPa) | | 2.2 | 2.4 | 3.5 | 2.4 | 2.1 | 2.5 | 2.1 |
| Elongation at break (%) | | 670 | 680 | 750 | 690 | 670 | 700 | 650 |

TABLE 4

|  |  | Example 22 | Example 23 | Example 24 | Example 25 | Example 26 | Example 27 | Example 28 |
|---|---|---|---|---|---|---|---|---|
| Urethane prepolymer having isocyanate group (A) |  | (A-4) | (A-5) | (A-6) | (A-1) | (A-1) | (A-1) | (A-1) |
| | Polyol (a1) | | | | | | | |
| | PTMG (parts by mass) | | 70 | | 70 | 70 | 70 | 70 |
| | PC (parts by mass) | 70 | | 70 | | | | |
| | PEs (1) (parts by mass) | | 30 | | 30 | 30 | 30 | 30 |
| | PEs (2) (parts by mass) | 30 | | 30 | | | | |
| | Polyisocyanate (a2) | | | | | | | |
| | MDI (parts by mass) | 25 | | | 25 | 25 | 25 | 25 |
| | XDI (parts by mass) | | 18 | 18 | | | | |
| | NCO % (%) | 3.2 | 3.2 | 3.2 | 3.3 | 3.3 | 3.3 | 3.3 |
| | Melting temperature (° C.) | 100 | 100 | 100 | 100 | 100 | 100 | 100 |
| | Melt viscosity at 100° C. (mPa · s) | 3500 | 2200 | 2300 | 2000 | 2000 | 2000 | 2000 |
| Foaming agent composition (B) |  | (B-6) | (B-6) | (B-6) | (B-8) | (B-9) | (B-10) | (B-6) |
| | N,N'-Dinitrosopentamethylenetetramine (b1) (parts by mass) | 2.5 | 2.5 | 2.5 | 1.5 | 3.5 | 5 | 2.5 |
| | Urea (b2) (parts by mass) | 2.5 | 2.5 | 2.5 | 3.5 | 1.5 | 5 | 2.5 |
| | Boric acid (b4) (parts by mass) | 0.5 | 0.5 | 0.5 | 0.5 | 0.5 | 1 | 0.5 |
| | Polyol (b3) (parts by mass) | | | | | | | |
| | MN3050 (parts by mass) | 5 | 5 | 5 | 5 | 5 | 10 | 5 |
| | Mass ratio (b1)/(b2) | 50/50 | 50/50 | 50/50 | 30/70 | 70/30 | 50/50 | 50/50 |
| | Amount of (b4) used per 100 parts by mass of (b2) | 20 | 20 | 20 | 14 | 33 | 20 | 20 |
| Amount of foaming agent composition used per 100 parts by mass of (A)(parts by mass) | | 10.5 | 10.5 | 10.5 | 10.5 | 10.5 | 21 | 10.5 |
| Post-heating temperature (° C.) | | 120 | 120 | 120 | 120 | 120 | 120 | 140 |
| Thickness of mixture applied (μm) | | 30 | 30 | 30 | 30 | 30 | 30 | 30 |
| Thickness of foamed and cured product (μm) | | 50 | 50 | 52 | 55 | 48 | 58 | 60 |
| Foaming degree of foamed and cured product | | 2.0 | 2.0 | 2.1 | 2.4 | 2.0 | 2.8 | 2.5 |
| Evaluation of foamed state | | A | A | A | A | A | A | A |
| Evaluation of texture | | A | A | A | A | A | A | A |

TABLE 4-continued

|  | Example 22 | Example 23 | Example 24 | Example 25 | Example 26 | Example 27 | Example 28 |
|---|---|---|---|---|---|---|---|
| Evaluation of mechanical properties | | | | | | | |
| 100% Modulus (MPa) | 0.2 | 0.3 | 0.3 | 0.3 | 0.2 | 0.2 | 0.2 |
| 200% Modulus (MPa) | 0.5 | 0.6 | 0.6 | 0.7 | 0.4 | 0.5 | 0.4 |
| Stress at break (MPa) | 2.2 | 2.3 | 2.5 | 3.0 | 2.1 | 2.4 | 2.1 |
| Elongation at break (%) | 660 | 630 | 620 | 600 | 720 | 680 | 690 |

TABLE 5

| | | Example 29 | Comparative Example 1 | Comparative Example 2 | Comparative Example 3 | Comparative Example 4 | Comparative Example 5 | Comparative Example 6 |
|---|---|---|---|---|---|---|---|---|
| Urethane prepolymer having isocyanate group (A) | | (A-1) | (A-1) | (A-1) | (A-1) | (A-1) | (A-1) | (A-1) |
| | Polyol (a1) | | | | | | | |
| | PTMG (parts by mass) | 70 | 70 | 70 | 70 | 70 | 70 | 70 |
| | PEs (1) (parts by mass) | 30 | 30 | 30 | 30 | 30 | 30 | 30 |
| | Polyisocyanate (a2) | | | | | | | |
| | MDI (parts by mass) | 25 | 25 | 25 | 25 | 25 | 25 | 25 |
| | NCO % (%) | 3.3 | 3.3 | 3.3 | 3.3 | 3.3 | 3.3 | 3.3 |
| | Melting temperature (° C.) | 100 | 100 | 100 | 100 | 100 | 100 | 100 |
| | Melt viscosity at 100° C. (mPa · s) | 2000 | 2000 | 2000 | 2000 | 2000 | 2000 | 2000 |
| Foaming agent composition (B) | | (B-11) | | (B'-1) | (B'-2) | (B'-3) | (B'-4) | (B'-5) |
| | N,N'-Dinitrosopentamethylenetetramine (b1) (parts by mass) | 2.5 | | 2.5 | | | | |
| | Urea (b2) (parts by mass) | 2.5 | | | 2.5 | 2.5 | 2.5 | 2.5 |
| | Boric acid (b4) (parts by mass) | 2.5 | | | | | | |
| | Polyol (b3) (parts by mass) | | | | | | | |
| | MN3050 (parts by mass) | 5 | | 5 | 5 | 5 | 5 | 5 |
| | Mass ratio (b1)/(b2) | 50/50 | — | 100/0 | 0/100 | 0/100 | 0/100 | 0/100 |
| | Amount of (b4) used per 100 parts by mass of (b2) | 100 | | | | | | |
| Other foaming agent compositions | | | (X-1) | | | | | |
| | ethylene glycol (parts by mass) | | 0.5 | | | | | |
| | N,N-dimethylcyclohexylamine (parts by mass) | | 0.1 | | | | | |
| | Water (parts by mass) | | 0.1 | | | | | |
| | Azodicarbonamide (parts by mass) | | | | | 2.5 | | |
| | 4,4'-Oxybis(benzenesulfonyl hydrazide) (parts by mass) | | | | | | 2.5 | |
| | Sodium hydrogen carbonate (parts by mass) | | | | | | | 2.5 |
| Amount of foaming agent composition used per 100 parts by mass of (A)(parts by mass) | | 12.5 | 0.7 | 7.5 | 7.5 | 10 | 10 | 10 |
| Post-heating temperature (° C.) | | 120 | — | 120 | 120 | 120 | 120 | 120 |
| Thickness of mixture applied (μm) | | 30 | 30 | 30 | 30 | 30 | 30 | 30 |
| Thickness of foamed and cured product (μm) | | 60 | 32 | 40 | 35 | 32 | 33 | 32 |
| Foaming degree of foamed and cured product | | 2.8 | 1.2 | 1.6 | 1.1 | 1.2 | 1.1 | 1.0 |
| Evaluation of foamed state | | A | B | B | B | B | B | B |
| Evaluation of texture | | A | C | C | C | C | C | C |
| Evaluation of mechanical properties | | | | | | | | |
| 100% Modulus (MPa) | | 0.2 | 0.5 | 0.5 | 0.1 | 0.5 | 0.5 | 0.1 |
| 200% Modulus (MPa) | | 0.5 | 0.8 | 0.8 | — | 0.9 | 0.8 | — |
| Stress at break (MPa) | | 2.5 | 2.0 | 1.8 | 0.6 | 2.0 | 1.9 | 0.4 |
| Elongation at break (%) | | 680 | 600 | 350 | 180 | 550 | 600 | 150 |

The abbreviations in Tables 1 to 5 will be described.

"PTMG": Polyoxytetramethylene glycol (number average molecular weight: 2,000)

"PC": Polycarbonate polyol ("NIPPORAN 980R" manufactured by Nippon Polyurethane Industry Co., Ltd., number average molecular weight: 2,000)

"PEs (1)": Polyester polyol (1) (reaction product of 1,6-hexanediol and adipic acid, number average molecular weight: 2,000)

"PEs (2)": Polyester polyol (2) (reaction product of a 6-mol propylene oxide adduct of bisphenol A and sebacic acid, number average molecular weight: 2,000)

"MDI": 4,4'-Diphenylmethane diisocyanate
"XDI": Xylylene diisocyanate

"MN3050": Polyoxypropylene triol ("MN-3050" manufactured by Mitsui Chemicals, Inc., number average molecular weight: 3,000)

"T700": Polyoxypropylene triol ("T-700" manufactured by Mitsui Chemicals, Inc., number average molecular weight: 700)

As shown in Tables 1 and 2, it turned out that in the moisture-curable hot melt urethane composition of the present invention, an excellent foamed state can be maintained even in a thin film, and a foamed and cured product with excellent texture can be obtained. In addition, no deterioration was confirmed in the mechanical properties.

In particular, it turned out that in the case where boric acid is used in the foaming agent composition (B) (Examples 15 to 29), a foamed and cured product with excellent texture can be obtained.

Meanwhile, in Comparative Example 1, foaming by a water foaming method was studied. As a result, as shown in FIG. 3, bubbles caused by water foaming did not remain, and there remained only bubbles involved during mixing the components (A) and (B), indicating that it was not possible to maintain an excellent foamed state. In addition, due to this, the texture of the foamed and cured product was not excellent either.

Comparative Example 2 is an example in which urea (b2) was not used in the foaming agent composition (B). As a result, as shown in FIG. 4, foaming was uncontrollable, and bubbles came in contact with the substrate. Accordingly, asperities were felt on the surface of the obtained foamed and cured product, and the texture was poor. In addition, deterioration was confirmed in the elongation at break, etc.

Comparative Example 3 is an example in which N,N'-dinitrosopentamethylenetetramine (b1) was not used in the foaming agent composition (B). As a result, there remained only bubbles involved during mixing the components (A) and (B). The texture of the obtained foamed and cured product was not excellent either.

Comparative Examples 4 to 6 are modes in which N,N'-dinitrosopentamethylenetetramine (b1) was replaced with other heat-decomposable foaming agents. As a result, as shown in FIG. 5, it was confirmed that the generated bubbles collapsed, and it was not possible to maintain an excellent foamed state in a thin film. In addition, due to this, the texture of the foamed and cured product was not excellent either.

[Preparation Example 1] Preparation of Surface Skin Layer (iii-1)

100 parts by mass of a solvent-based polyether urethane resin "CRISVON NB-130" manufactured by DIC Corporation was mixed with 20 parts by mass of a pigment "DILAC BLACK L-6001" manufactured by DIC Corporation and 40 parts by mass of an equal-amount mixture of methyl ethyl ketone/N,N-dimethylformamide, and applied using a comma coater onto a release paper to a wet coating weight of 100 g/m². The applied mixture was then dried at 70° C. for 2 minutes and at 120° C. for 2 minutes, thereby preparing a surface skin layer (iii-1) having a thickness of 30 μm.

[Preparation Example 2] Preparation of Surface Skin Layer (iii-2)

100 parts by mass of a water-based polyether urethane resin "HYDRAN WLS-230" manufactured by DIC Corporation was mixed with 10 parts by mass of a pigment "DILAC BLACK HS-9533" manufactured by DIC Corporation, and applied using a comma coater onto a release paper to a wet coating weight of 100 g/m². The applied mixture was then dried at 70° C. for 2 minutes and at 120° C. for 2 minutes, thereby preparing a surface skin layer (iii-2) having a thickness of 30 μm.

Example 30

100 parts by mass of the hot melt urethane prepolymer (A-1) was heated to 100° C. to be thereby melted. Subsequently, a foaming agent composition (B-1) obtained by mixing and stirring 5 parts by mass of polyoxypropylene triol ("MN-3050" manufactured by Mitsui Chemicals, Inc., number average molecular weight: 3,000), 2.5 parts by mass of N,N'-dinitrosopentamethylenetetramine, and 2.5 parts by mass of urea was stirred with the melted hot melt urethane prepolymer (A-1) using a two-component mixing and stirring machine, thereby giving a moisture-curable hot melt urethane composition.

Subsequently, the obtained moisture-curable hot melt urethane composition was applied onto the surface skin layer (iii-1) using a comma coater to provide a thickness of 30 μm, followed by a heating treatment at 120° C. for 5 minutes, and a nonwoven fabric was attached thereto. They were then allowed to stand for 3 days under conditions of a temperature of 23° C. and a relative humidity of 65%, thereby giving a synthetic leather including a 45-μm-thick intermediate layer (ii).

Examples 31 to 40

Synthetic leathers were obtained in the same manner as in Example 30, except that the hot melt urethane prepolymer (A), the foaming agent composition (B), the heat-melting temperature of the hot melt urethane prepolymer (A), the surface skin layer (iii), the thickness of the moisture-curable hot melt urethane composition to be applied, and the temperature of post-heating were changed as shown in Tables 6 and 7.

Example 41

100 parts by mass of the hot melt urethane prepolymer (A-1) was heated to 100° C. to be thereby melted. Subsequently, a foaming agent composition (B-6) obtained by mixing and stirring 5 parts by mass of polyoxypropylene triol ("MN-3050" manufactured by Mitsui Chemicals, Inc., number average molecular weight: 3,000), 2.5 parts by mass of N,N'-dinitrosopentamethylenetetramine, 2.5 parts by mass of urea, and 0.5 parts by mass of boric acid was stirred with the melted hot melt urethane prepolymer (A-1) using a two-component mixing and stirring machine, thereby giving a moisture-curable hot melt urethane composition.

Subsequently, the obtained moisture-curable hot melt urethane composition was applied onto the surface skin layer (iii-1) using a comma coater to provide a thickness of 30 μm, followed by a heating treatment at 120° C. for 5 minutes, and a nonwoven fabric was attached thereto. They were then allowed to stand for 3 days under conditions of a temperature of 23° C. and a relative humidity of 65%, thereby giving a synthetic leather including a 50-μm-thick intermediate layer (ii).

Examples 42 to 56

Synthetic leathers were obtained in the same manner as in Example 41, except that the hot melt urethane prepolymer (A), the foaming agent composition (B), the heat-melting temperature of the hot melt urethane prepolymer (A), the surface skin layer (iii), the thickness of the moisture-curable hot melt urethane composition to be applied, and the temperature of post-heating were changed as shown in Tables 7 to 9.

Example 57

100 parts by mass of the hot melt urethane prepolymer (A-3) was heated to 100° C. to be thereby melted. Subsequently, a foaming agent composition (B-1) obtained by mixing and stirring 5 parts by mass of polyoxypropylene triol ("MN-3050" manufactured by Mitsui Chemicals, Inc., number average molecular weight: 3,000), 2.5 parts by mass of N,N'-dinitrosopentamethylenetetramine, and 2.5 parts by mass of urea was stirred with the melted hot melt urethane prepolymer (A-3) using a two-component mixing and stirring machine, thereby giving a moisture-curable hot melt urethane composition.

Subsequently, the obtained moisture-curable hot melt urethane composition was applied onto the surface skin layer (iii-1) using a comma coater to provide a thickness of 30 μm, followed by a heating treatment at 120° C. for 5 minutes, and a nonwoven fabric was attached thereto. They were then allowed to stand for 3 days under conditions of a temperature of 23° C. and a relative humidity of 65%, thereby giving a synthetic leather including a 45-μm-thick intermediate layer (ii).

Examples 58 to 67

Synthetic leathers were obtained in the same manner as in Example 57, except that the hot melt urethane prepolymer (A), the foaming agent composition (B), the heat-melting temperature of the hot melt urethane prepolymer (A), the surface skin layer (iii), the thickness of the moisture-curable hot melt urethane composition to be applied, and the temperature of post-heating were changed as shown in Tables 10 and 11.

Example 68

100 parts by mass of the hot melt urethane prepolymer (A-3) was heated to 100° C. to be thereby melted. Subsequently, a foaming agent composition (B-6) obtained by mixing and stirring 5 parts by mass of polyoxypropylene triol ("MN-3050" manufactured by Mitsui Chemicals, Inc., number average molecular weight: 3,000), 2.5 parts by mass of N,N'-dinitrosopentamethylenetetramine, 2.5 parts by mass of urea, and 0.5 parts by mass of boric acid was stirred with the melted hot melt urethane prepolymer (A-3) using a two-component mixing and stirring machine, thereby giving a moisture-curable hot melt urethane composition.

Subsequently, the obtained moisture-curable hot melt urethane composition was applied onto the surface skin layer (iii-1) using a comma coater to provide a thickness of 30 μm, followed by a heating treatment at 120° C. for 5 minutes, and a nonwoven fabric was attached thereto. They were then allowed to stand for 3 days under conditions of a temperature of 23° C. and a relative humidity of 65%, thereby giving a synthetic leather including a 50-μm-thick intermediate layer (ii).

Examples 69 to 83

Synthetic leathers were obtained in the same manner as in Example 68, except that the hot melt urethane prepolymer (A), the foaming agent composition (B), the heat-melting temperature of the hot melt urethane prepolymer (A), the surface skin layer (iii), the thickness of the moisture-curable hot melt urethane composition to be applied, and the temperature of post-heating were changed as shown in Tables 11 to 13.

Comparative Example 7

100 parts by mass of the hot melt urethane prepolymer (A-1) was heated to 100° C. to be thereby melted. Subsequently, a water-foamed composition (X-1) obtained by mixing 0.5 parts by mass of ethylene glycol, 0.1 parts by mass of N,N-dimethylcyclohexylamine, and 0.1 parts of water was mixed with the melted hot melt urethane prepolymer (A-1) and stirred using a two-component mixing and stirring machine, thereby giving a moisture-curable hot melt urethane composition.

The composition was then applied onto the surface skin layer (iii-1) using a comma coater to provide a thickness of 30 μm, and a nonwoven fabric was attached to the applied surface. They were then allowed to stand for 5 days under conditions of a temperature of 23° C. and a relative humidity of 65%, thereby giving a synthetic leather including a 32-μm-thick intermediate layer (ii).

Comparative Example 8

100 parts by mass of the hot melt urethane prepolymer (A-1) was heated to 100° C. to be thereby melted. Subsequently, a foaming agent composition (B'-1) obtained by mixing 5 parts by mass of polyoxypropylene triol ("MN-3050" manufactured by Mitsui Chemicals, Inc., number average molecular weight: 3,000) and 2.5 parts by mass of N,N'-dinitrosopentamethylenetetramine was stirred with the melted hot melt urethane prepolymer (A-1) using a two-component mixing and stirring machine, thereby giving a moisture-curable hot melt urethane composition.

Subsequently, the obtained moisture-curable hot melt urethane composition was applied onto the surface skin layer (iii-1) using a comma coater to provide a thickness of 30 μm, followed by a heating treatment at 120° C. for 5 minutes, and a nonwoven fabric was attached thereto. They were then allowed to stand for 3 days under conditions of a temperature of 23° C. and a relative humidity of 65%, thereby giving a synthetic leather including a 40-μm-thick intermediate layer (ii).

Comparative Examples 9 to 12

Synthetic leathers were obtained in the same manner as in Comparative Example 2, except that the hot melt urethane prepolymer (A), the foaming agent composition (B), the heat-melting temperature of the hot melt urethane prepolymer (A), the surface skin layer (iii), the thickness of the moisture-curable hot melt urethane composition to be applied, and the temperature of post-heating were changed as shown in Table 14.

[Measurement Method for Foaming Degree of Intermediate Layer (ii)]

In the examples and comparative examples, the volume immediately after adding the melted hot melt urethane prepolymer (A) and the foaming agent composition (B) or water-foamed composition (X) ($V_1$) and the volume of the cured product after foaming ($V_2$) were measured, and the foaming degree was calculated from their ratio ($V_2/V_1$).

[Evaluation Method for Foamed State]

The intermediate layers (ii) of the synthetic leathers obtained in the examples and comparative examples were observed using a scanning electron microscope "SU3500" manufactured by Hitachi High-Technologies Corporation (magnification: 200) and evaluated as follows.

"A": Excellent foamed state can be confirmed.
"B": Excellent foamed state cannot be confirmed.

[Evaluation Method for Texture]

The textures of the synthetic leathers obtained in the examples and comparative examples were evaluated based on the tactile impression.

"A": Extremely high flexibility, and no asperities are confirmed.

"B": Good flexibility, and no asperities are confirmed.

"C": Hard, or asperities are confirmed.

[Evaluation Method for Hydrolysis Resistance]

Onto the surface skin layers of the synthetic leathers obtained in Examples 30 to 56 and Comparative Examples 7 to 12, a hot melt fabric tape was bonded at 130° C. over 5 seconds. Then, using TENSILON (TENSILON Universal Tester "RTC-1210A" manufactured by Orientec Co., Ltd.), the peel strength was measured by crosshead measurement at 200 mm/min and defined as peel strength in normal state.

Next, the synthetic leathers obtained in the examples and comparative examples were allowed to stand for 5 weeks under conditions of a temperature of 70° C. and a humidity of 95%, and then the peel strength was measured in the same manner and defined as peel strength after hydrolysis resistance test.

[Evaluation Method for Bending Resistance]

Using "MIT Bending Tester" manufactured by Toyo Seiki Seisaku-sho, Ltd., the synthetic leathers obtained in Examples 30 to 56 and Comparative Examples 7 to 12 were subjected to a 300,000-times bending test at room temperature (23° C.) and also to a 100,000-times bending test at low temperature (−10° C.). When the surface did not crack, such a sample is indicated with "T", while in the case where cracking occurred during the test, the number of bends at that time is shown in the tables.

Next, the synthetic leathers obtained in the examples and comparative examples were allowed to stand for 5 weeks under conditions of a temperature of 70° C. and a humidity of 95%. The bending resistance test was then performed in the same manner, and the bending resistance after hydrolysis resistance test was also evaluated in the same manner.

[Evaluation Method for Durability]

Onto the surface skin layers of the synthetic leathers obtained in Examples 57 to 83, a hot melt fabric tape was bonded at 130° C. over 5 seconds. Then, using TENSILON (TENSILON Universal Tester "RTC-1210A" manufactured by Orientec Co., Ltd.), the peel strength was measured by crosshead measurement at 200 mm/min and defined as peel strength in normal state.

Next, the synthetic leathers obtained in the examples and comparative examples were allowed to stand for 5 weeks under conditions of a temperature of 70° C. and a humidity of 95%, and then the peel strength was measured in the same manner and defined as peel strength after hydrolysis resistance test.

Further, the synthetic leathers obtained in the examples and comparative examples were allowed to stand for 500 hours under conditions of a temperature of 120° C., and then the peel strength was measured in the same manner and defined as peel strength after heat resistance test.

TABLE 6

|  |  | Example 30 | Example 31 | Example 32 | Example 33 | Example 34 | Example 35 | Example 36 |
|---|---|---|---|---|---|---|---|---|
| Base fabric (i) |  | Nonwoven fabric | Nonwoven fabric | Nonwoven fabric | Nonwoven fabric | Nonwoven fabric | Nonwoven fabric | Nonwoven fabric |
| Surface skin layer (iii) |  | (iii-1) | (iii-1) | (iii-1) | (iii-1) | (iii-1) | (iii-1) | (iii-1) |
| Intermediate layer (ii) |  |  |  |  |  |  |  |  |
| Urethane prepolymer having isocyanate group (A) |  | (A-1) | (A-1) | (A-1) | (A-1) | (A-2) | (A-2) | (A-5) |
|  | Polytetramethylene glycol (a1) |  |  |  |  |  |  |  |
|  | PTMG (parts by mass) | 70 | 70 | 70 | 70 | 70 | 70 | 70 |
|  | Other polyols |  |  |  |  |  |  |  |
|  | PEs (1) (parts by mass) | 30 | 30 | 30 | 30 |  |  | 30 |
|  | PEs (2) (parts by mass) |  |  |  |  | 30 | 30 |  |
|  | Polyisocyanate (a2) |  |  |  |  |  |  |  |
|  | MDI (parts by mass) | 25 | 25 | 25 | 25 | 25 | 25 |  |
|  | XDI (parts by mass) |  |  |  |  |  |  | 18 |
|  | NCO % (%) | 3.3 | 3.3 | 3.3 | 3.3 | 3.3 | 3.3 | 3.2 |
|  | Melting temperature (° C.) | 100 | 100 | 100 | 100 | 100 | 100 | 100 |
|  | Melt viscosity at 100° C. (mPa · s) | 2000 | 2000 | 2000 | 2000 | 3000 | 3000 | 2200 |
| Foaming agent composition (B) |  | (B-1) | (B-1) | (B-1) | (B-2) | (B-1) | (B-1) | (B-1) |
|  | N,N'-Dinitrosopentamethylenetetramine (b1) (parts by mass) | 2.5 | 2.5 | 2.5 | 2.5 | 2.5 | 2.5 | 2.5 |
|  | Urea (b2) (parts by mass) | 2.5 | 2.5 | 2.5 | 2.5 | 2.5 | 2.5 | 2.5 |
|  | Polyol (b3) (parts by mass) |  |  |  |  |  |  |  |
|  | MN3050 (parts by mass) | 5 | 5 | 5 |  | 5 | 5 | 5 |
|  | T700 (parts by mass) |  |  |  | 5 |  |  |  |
|  | Mass ratio (b1)/(b2) | 50/50 | 50/50 | 50/50 | 50/50 | 50/50 | 50/50 | 50/50 |
| Amount of foaming agent composition used per 100 parts by mass of (A) (parts by mass) |  | 10 | 10 | 10 | 10 | 10 | 10 | 10 |
| Post-heating temperature (° C.) |  | 120 | 120 | 120 | 120 | 120 | 120 | 120 |
| Thickness of mixture applied (μm) |  | 30 | 50 | 100 | 30 | 30 | 50 | 30 |
| Thickness of foamed and cured product (μm) |  | 45 | 100 | 200 | 50 | 50 | 110 | 45 |
| Foaming degree of foamed and cured product |  | 1.8 | 2 | 2.2 | 1.7 | 1.8 | 2 | 1.8 |
| Evaluation of foamed state |  | A | A | A | A | A | A | A |
| Texture |  | B | B | B | B | B | B | B |
| Hydrolysis resistance Peel strength (N/cm): Normal state |  | 19.6 | 31.4 | 27.4 | 19.6 | 21.6 | 30.6 | 19.6 |
| : After hydrolysis resistance test |  | 18.8 | 30.6 | 26.7 | 19.2 | 21.2 | 30.6 | 19.6 |
| Bending resistance: |  |  |  |  |  |  |  |  |
| Normal state: −10° C.: 100,000 times |  | T | T | T | T | T | T | T |
| 23° C. * 300,000 times |  | T | T | T | T | T | T | T |
| After hydrolysis resistance test: −10° C.: 100,000 times |  | T | T | T | T | T | T | T |
| 23° C. * 300,000 times |  | T | T | T | T | T | T | T |

TABLE 7

|  |  | Example 37 | Example 38 | Example 39 | Example 40 | Example 41 | Example 42 | Example 43 |
|---|---|---|---|---|---|---|---|---|
| Base fabric (i) |  | Nonwoven fabric | Nonwoven fabric | Nonwoven fabric | Nonwoven fabric | Nonwoven fabric | Nonwoven fabric | Nonwoven fabric |
| Surface skin layer (iii) |  | (iii-1) | (iii-1) | (iii-1) | (iii-1) | (iii-1) | (iii-1) | (iii-1) |
| Intermediate layer (ii) |  |  |  |  |  |  |  |  |
| Urethane prepolymer having isocyanate group (A) |  | (A-1) | (A-1) | (A-1) | (A-1) | (A-1) | (A-1) | (A-1) |
|  | Polytetramethylene glycol (a1) |  |  |  |  |  |  |  |
|  | PTMG (parts by mass) | 70 | 70 | 70 | 70 | 70 | 70 | 70 |
|  | Other polyols |  |  |  |  |  |  |  |
|  | PEs (1) (parts by mass) | 30 | 30 | 30 | 30 | 30 | 30 | 30 |
|  | PEs (2) (parts by mass) |  |  |  |  |  |  |  |
|  | Polyisocyanate (a2) |  |  |  |  |  |  |  |
|  | MDI (parts by mass) | 25 | 25 | 25 | 25 | 25 | 25 | 25 |
|  | XDI (parts by mass) |  |  |  |  |  |  |  |
|  | NCO % (%) | 3.3 | 3.3 | 3.3 | 3.3 | 3.3 | 3.3 | 3.3 |
|  | Melting temperature (° C.) | 100 | 100 | 100 | 100 | 100 | 100 | 100 |
|  | Melt viscosity at 100° C. (mPa·s) | 2000 | 2000 | 2000 | 2000 | 2000 | 2000 | 2000 |
| Foaming agent composition (B) |  | (B-3) | (B-4) | (B-5) | (B-1) | (B-6) | (B-6) | (B-6) |
|  | N,N'-Dinitrosopentamethylenetetramine (b1) (parts by mass) | 1.5 | 3.5 | 5 | 2.5 | 2.5 | 2.5 | 2.5 |
|  | Urea (b2) (parts by mass) | 3.5 | 1.5 | 5 | 2.5 | 2.5 | 2.5 | 2.5 |
|  | Boric acid (b4) (parts by mass) |  |  |  |  | 0.5 | 0.5 | 0.5 |
|  | Polyol (b3) (parts by mass) |  |  |  |  |  |  |  |
|  | MN3050 (parts by mass) | 5 | 5 | 10 | 5 | 5 | 5 | 5 |
|  | Mass ratio (b1)/(b2) | 30/70 | 70/30 | 50/50 | 50/50 | 50/50 | 50/50 | 50/50 |
| Amount of foaming agent composition used per 100 parts by mass of (A) (parts by mass) |  | 10 | 10 | 20 | 10 | 10.5 | 10.5 | 10.5 |
| Post-heating temperature (° C.) |  | 120 | 120 | 120 | 140 | 120 | 120 | 120 |
| Thickness of mixture applied (μm) |  | 30 | 30 | 30 | 30 | 30 | 50 | 100 |
| Thickness of foamed and cured product (μm) |  | 50 | 45 | 50 | 55 | 50 | 120 | 220 |
| Foaming degree of foamed and cured product |  | 1.7 | 2.2 | 2 | 2.5 | 2.1 | 2.4 | 2.6 |
| Evaluation of foamed state |  | A | A | A | A | A | A | A |
| Texture |  | B | B | B | B | A | A | A |
| Hydrolysis resistance Peel strength (N/cm): Normal state |  | 23.5 | 21.6 | 19.6 | 17.6 | 18.8 | 29.4 | 26.7 |
| : After hydrolysis resistance test |  | 21.6 | 21.2 | 19.6 | 17.6 | 18.8 | 29.0 | 26.7 |
| Bending resistance: |  |  |  |  |  |  |  |  |
| Normal state: −10° C.: 100,000 times |  | T | T | T | T | T | T | T |
| 23° C. * 300,000 times |  | T | T | T | T | T | T | T |
| After hydrolysis resistance test: −10° C.: 100,000 times |  | T | T | T | T | T | T | T |
| 23° C. * 300,000 times |  | T | T | T | T | T | T | T |

TABLE 8

|  |  | Example 44 | Example 45 | Example 46 | Example 47 | Example 48 | Example 49 | Example 50 |
|---|---|---|---|---|---|---|---|---|
| Base fabric (i) |  | Nonwoven fabric | Nonwoven fabric | Nonwoven fabric | Nonwoven fabric | Nonwoven fabric | Nonwoven fabric | Nonwoven fabric |
| Surface skin layer (iii) |  | (iii-1) | (iii-1) | (iii-1) | (iii-1) | (iii-1) | (iii-1) | (iii-1) |
| Intermediate layer (ii) |  |  |  |  |  |  |  |  |
| Urethane prepolymer having isocyanate group (A) |  | (A-1) | (A-2) | (A-2) | (A-5) | (A-1) | (A-1) | (A-1) |
|  | Polytetramethylene glycol (a1) |  |  |  |  |  |  |  |
|  | PTMG (parts by mass) | 70 | 70 | 70 | 70 | 70 | 70 | 70 |
|  | Other polyols |  |  |  |  |  |  |  |
|  | PEs (1) (parts by mass) | 30 |  |  | 30 | 30 | 30 | 30 |
|  | PEs (2) (parts by mass) |  | 30 | 30 |  |  |  |  |
|  | Polyisocyanate (a2) |  |  |  |  |  |  |  |
|  | MDI (parts by mass) | 25 | 25 | 25 |  | 25 | 25 | 25 |
|  | XDI (parts by mass) |  |  |  | 18 |  |  |  |
|  | NCO % (%) | 3.3 | 3.3 | 3.3 | 3.2 | 3.3 | 3.3 | 3.3 |
|  | Melting temperature (° C.) | 100 | 100 | 100 | 100 | 100 | 100 | 100 |
|  | Melt viscosity at 100° C. (mPa·s) | 2000 | 3000 | 3000 | 2200 | 2000 | 2000 | 2000 |
| Foaming agent composition (B) |  | (B-7) | (B-6) | (B-6) | (B-6) | (B-8) | (B-9) | (B-10) |
|  | N,N'-Dinitrosopentamethylenetetramine (b1) (parts by mass) | 2.5 | 2.5 | 2.5 | 2.5 | 1.5 | 3.5 | 5 |
|  | Urea (b2) (parts by mass) | 2.5 | 2.5 | 2.5 | 2.5 | 3.5 | 1.5 | 5 |
|  | Boric acid (b4) (parts by mass) | 0.5 | 0.5 | 0.5 | 0.5 | 0.5 | 0.5 | 1 |
|  | Polyol (b3) (parts by mass) |  |  |  |  |  |  |  |
|  | MN3050 (parts by mass) |  | 5 | 5 | 5 | 5 | 5 | 10 |
|  | T700 (parts by mass) | 5 |  |  |  |  |  |  |
|  | Mass ratio (b1)/(b2) | 50/50 | 50/50 | 50/50 | 50/50 | 30/70 | 70/30 | 50/50 |

TABLE 8-continued

|  | Example 44 | Example 45 | Example 46 | Example 47 | Example 48 | Example 49 | Example 50 |
|---|---|---|---|---|---|---|---|
| Amount of foaming agent composition used per 100 parts by mass of (A) (parts by mass) | 10.5 | 10.5 | 10.5 | 10.5 | 10.5 | 10.5 | 21 |
| Post-heating temperature (° C.) | 120 | 120 | 120 | 120 | 120 | 120 | 120 |
| Thickness of mixture applied (μm) | 30 | 30 | 50 | 30 | 30 | 30 | 30 |
| Thickness of foamed and cured product (μm) | 55 | 55 | 130 | 50 | 55 | 48 | 58 |
| Foaming degree of foamed and cured product | 2.1 | 2.2 | 2.3 | 2.0 | 2.4 | 2.0 | 2.8 |
| Evaluation of foamed state | A | A | A | A | A | A | A |
| Texture | A | A | A | A | A | A | A |
| Hydrolysis resistance Peel strength (N/cm): Normal state | 18.8 | 20.8 | 29.4 | 18.8 | 21.6 | 19.6 | 18.8 |
| : After hydrolysis resistance test | 18.8 | 20.8 | 29.4 | 18.8 | 20.8 | 18.8 | 18.8 |
| Bending resistance: | | | | | | | |
| Normal state: −10° C.: 100,000 times | T | T | T | T | T | T | T |
| 23° C. * 300,000 times | T | T | T | T | T | T | T |
| After hydrolysis resistance test: −10° C.: 100,000 times | T | T | T | T | T | T | T |
| 23° C. * 300,000 times | T | T | T | T | T | T | T |

TABLE 9

|  |  | Example 51 | Example 52 | Example 53 | Example 54 | Example 55 | Example 56 |
|---|---|---|---|---|---|---|---|
| Base fabric (i) | | Nonwoven fabric | Nonwoven fabric | Nonwoven fabric | Nonwoven fabric | Nonwoven fabric | Nonwoven fabric |
| Surface skin layer (iii) | | (iii-1) | (iii-2) | (iii-2) | (iii-2) | (iii-2) | (iii-2) |
| Intermediate layer (ii) | | | | | | | |
| Urethane prepolymer having isocyanate group (A) | | (A-1) | (A-1) | (A-1) | (A-1) | (A-1) | (A-2) |
| | Polytetramethylene glycol (a1) | | | | | | |
| | PTMG (parts by mass) | 70 | 70 | 70 | 70 | 70 | 70 |
| | Other polyols | | | | | | |
| | PEs (1) (parts by mass) | 30 | 30 | 30 | 30 | 30 | |
| | PEs (2) (parts by mass) | | | | | | 30 |
| | Polyisocyanate (a2) | | | | | | |
| | MD (parts by mass) | 25 | 25 | 25 | 25 | 25 | 25 |
| | NCO % (%) | 3.3 | 3.3 | 3.3 | 3.3 | 3.3 | 3.3 |
| | Melting temperature (° C.) | 100 | 100 | 100 | 100 | 100 | 100 |
| | Melt viscosity at 100° C. (mPa · s) | 2000 | 2000 | 2000 | 2000 | 2000 | 3000 |
| Foaming agent composition (B) | | (B-11) | (B-1) | (B-1) | (B-6) | (B-6) | (B-6) |
| | N,N'-Dinitrosopentamethylenetetramine (b1) (parts by mass) | 2.5 | 2.5 | 2.5 | 2.5 | 2.5 | 2.5 |
| | Urea (b2) (parts by mass) | 2.5 | 2.5 | 2.5 | 2.5 | 2.5 | 2.5 |
| | Boric acid (b4) (parts by mass) | 2.5 | | | 0.5 | 0.5 | 0.5 |
| | Polyol (b3) | | | | | | |
| | MN3050 (parts by mass) | 5 | 5 | 5 | 5 | 5 | 5 |
| | Mass ratio (b1)/(b2) | 50/50 | 50/50 | 50/50 | 50/50 | 50/50 | 50/50 |
| Amount of foaming agent composition used per 100 parts by mass of (A) (parts by mass) | | 12.5 | 10 | 10 | 10.5 | 10.5 | 10.5 |
| Post-heating temperature (° C.) | | 120 | 120 | 120 | 120 | 120 | 120 |
| Thickness of mixture applied (μm) | | 30 | 30 | 50 | 30 | 50 | 50 |
| Thickness of foamed and cured product (μm) | | 60 | 45 | 100 | 50 | 120 | 125 |
| Foaming degree of foamed and cured product | | 2.8 | 1.5 | 2.0 | 1.7 | 2.4 | 2.5 |
| Evaluation of foamed state | | A | A | A | A | A | A |
| Texture | | A | B | B | A | A | A |
| Hydrolysis resistance Peel strength (N/cm): Normal state | | 17.6 | 19.6 | 30.6 | 18.8 | 29.0 | 28.2 |
| : After hydrolysis resistance test | | 17.6 | 19.2 | 30.6 | 18.8 | 29.0 | 28.2 |
| Bending resistance: | | | | | | | |
| Normal state: −10° C.: 100,000 times | | ◯ | ◯ | ◯ | ◯ | ◯ | ◯ |
| 23° C. * 300,000 times | | ◯ | ◯ | ◯ | ◯ | ◯ | ◯ |
| After hydrolysis resistance test: −10° C.: 100,000 times | | ◯ | ◯ | ◯ | ◯ | ◯ | ◯ |
| 23° C. * 300,000 times | | ◯ | ◯ | ◯ | ◯ | ◯ | ◯ |

TABLE 10

|  |  | Example 57 | Example 58 | Example 59 | Example 60 | Example 61 | Example 62 | Example 63 |
|---|---|---|---|---|---|---|---|---|
| Base fabric (i) |  | Nonwoven fabric | Nonwoven fabric | Nonwoven fabric | Nonwoven fabric | Nonwoven fabric | Nonwoven fabric | Nonwoven fabric |
| Surface skin layer (iii) |  | (iii-1) | (iii-1) | (iii-1) | (iii-1) | (iii-1) | (iii-1) | (iii-1) |
| Intermediate layer (ii) |  |  |  |  |  |  |  |  |
| Urethane prepolymer having isocyanate group (A) |  | (A-3) | (A-3) | (A-3) | (A-3) | (A-7) | (A-7) | (A-8) |
|  | Polycarbonate polyol (a1) |  |  |  |  |  |  |  |
|  | PC (parts by mass) | 70 | 70 | 70 | 70 | 70 | 70 | 70 |
|  | Other polyols |  |  |  |  |  |  |  |
|  | PEs (1) (parts by mass) | 30 | 30 | 30 | 30 |  |  | 30 |
|  | PEs (2) (parts by mass) |  |  |  |  | 30 | 30 |  |
|  | Polyisocyanate (a2) |  |  |  |  |  |  |  |
|  | MDI (parts by mass) | 25 | 25 | 25 | 25 | 25 | 25 |  |
|  | XDI (parts by mass) |  |  |  |  |  |  | 18 |
|  | NCO % (%) | 3.2 | 3.3 | 3.3 | 3.3 | 3.2 | 32 | 3.2 |
|  | Melting temperature (° C.) | 100 | 100 | 100 | 100 | 100 | 100 | 100 |
|  | Melt viscosity at 100° C. (mPa·s) | 2500 | 2500 | 2500 | 2500 | 2300 | 2300 | 2200 |
| Foaming agent composition (B) |  | (B-1) | (B-1) | (B-1) | (B-2) | (B-1) | (B-1) | (B-1) |
|  | N,N'-Dinitrosopentamethylenetetramine (b1) (parts by mass) | 2.5 | 2.5 | 2.5 | 2.5 | 2.5 | 2.5 | 2.5 |
|  | Urea (b2) (parts by mass) | 2.5 | 2.5 | 2.5 | 2.5 | 2.5 | 2.5 | 2.5 |
|  | Polyol (b3) (parts by mass) |  |  |  |  |  |  |  |
|  | MN3050 (parts by mass) | 5 | 5 | 5 |  | 5 | 5 | 5 |
|  | T700 (parts by mass) |  |  |  | 5 |  |  |  |
|  | Mass ratio (b1)/(b2) | 50/50 | 50/50 | 50/50 | 50/50 | 50/50 | 50/50 | 50/50 |
| Amount of foaming agent composition used per 100 parts by mass of (A) (parts by mass) |  | 10 | 10 | 10 | 10 | 10 | 10 | 10 |
| Post-heating temperature (° C.) |  | 120 | 120 | 120 | 120 | 120 | 120 | 120 |
| Thickness of mixture applied (μm) |  | 30 | 50 | 100 | 30 | 30 | 50 | 30 |
| Thickness of foamed and cured product (μm) |  | 45 | 100 | 200 | 50 | 50 | 110 | 45 |
| Foaming degree of foamed and cured product |  | 1.8 | 2 | 2.2 | 1.7 | 1.8 | 2 | 1.8 |
| Evaluation of foamed state |  | A | A | A | A | A | A | A |
| Texture |  | B | B | B | B | B | B | B |
| Evaluation of Durability Peel strength (N/cm): Normal state |  | 23.5 | 33.3 | 27.4 | 23.5 | 23.5 | 31.4 | 23.5 |
| : After hydrolysis resistance test |  | 23.5 | 33.3 | 27.0 | 23.1 | 23.5 | 31.0 | 23.1 |
| : After heat resistance test |  | 23.5 | 33.3 | 26.7 | 22.7 | 23.5 | 31.0 | 23.1 |

TABLE 11

|  |  | Example 64 | Example 65 | Example 66 | Example 67 | Example 68 | Example 69 | Example 70 |
|---|---|---|---|---|---|---|---|---|
| Base fabric (i) |  | Nonwoven fabric | Nonwoven fabric | Nonwoven fabric | Nonwoven fabric | Nonwoven fabric | Nonwoven fabric | Nonwoven fabric |
| Surface skin layer (iii) |  | (iii-1) | (iii-1) | (iii-1) | (iii-1) | (iii-1) | (iii-1) | (iii-1) |
| Intermediate layer (ii) |  |  |  |  |  |  |  |  |
| Urethane prepolymer having isocyanate group (A) |  | (A-3) | (A-3) | (A-3) | (A-3) | (A-3) | (A-3) | (A-3) |
|  | Polycarbonate polyol (a1) |  |  |  |  |  |  |  |
|  | PC (parts by mass) | 70 | 70 | 70 | 70 | 70 | 70 | 70 |
|  | Other polyols |  |  |  |  |  |  |  |
|  | PEs (1) (parts by mass) | 30 | 30 | 30 | 30 | 30 | 30 | 30 |
|  | PEs (2) (parts by mass) |  |  |  |  |  |  |  |
|  | Polyisocyanate (a2) |  |  |  |  |  |  |  |
|  | MDI (parts by mass) | 25 | 25 | 25 | 25 | 25 | 25 | 25 |
|  | XDI (parts by mass) |  |  |  |  |  |  |  |
|  | NCO % (%) | 3.3 | 3.3 | 3.3 | 3.3 | 3.3 | 3.3 | 3.3 |
|  | Melting temperature (° C.) | 100 | 100 | 100 | 100 | 100 | 100 | 100 |
|  | Melt viscosity at 100° C. (mPa·s) | 2500 | 2500 | 2500 | 2500 | 2500 | 2500 | 2500 |
| Foaming agent composition (B) |  | (B-3) | (B-4) | (B-5) | (B-1) | (B-6) | (B-6) | (B-6) |
|  | N,N'-Dinitrosopentamethylenetetramine (b1) (parts by mass) | 1.5 | 3.5 | 5 | 2.5 | 2.5 | 2.5 | 2.5 |
|  | Urea (b2) (parts by mass) | 3.5 | 1.5 | 5 | 2.5 | 2.5 | 2.5 | 2.5 |
|  | Boric acid (b4) (parts by mass) |  |  |  |  | 0.5 | 0.5 | 0.5 |
|  | Polyol (b3) (parts by mass) |  |  |  |  |  |  |  |
|  | MN3050 (parts by mass) | 5 | 5 | 10 | 5 | 5 | 5 | 5 |
|  | Mass ratio (b1)/(b2) | 30/70 | 70/30 | 50/50 | 50/50 | 50/50 | 50/50 | 50/50 |
| Amount of foaming agent composition used per 100 parts by mass of (A) (parts by mass) |  | 10 | 10 | 20 | 10 | 10.5 | 10.5 | 10.5 |
| Post-heating temperature (° C.) |  | 120 | 120 | 120 | 140 | 120 | 120 | 120 |
| Thickness of mixture applied (μm) |  | 30 | 30 | 30 | 30 | 30 | 50 | 100 |
| Thickness of foamed and cured product (μm) |  | 50 | 45 | 50 | 55 | 50 | 120 | 220 |
| Foaming degree of foamed and cured product |  | 1.7 | 2.2 | 2 | 2.5 | 2.1 | 2.4 | 2.6 |
| Evaluation of foamed state |  | A | A | A | A | A | A | A |

TABLE 11-continued

|  | Example 64 | Example 65 | Example 66 | Example 67 | Example 68 | Example 69 | Example 70 |
|---|---|---|---|---|---|---|---|
| Texture | B | B | B | B | A | A | A |
| Evaluation of Durability Peel strength (N/cm): Normal state | 31.4 | 29.4 | 28.6 | 27.4 | 29.4 | 31.4 | 29.4 |
| : After hydrolysis resistance test | 31.0 | 29.4 | 28.2 | 27.4 | 29.4 | 31.4 | 29.4 |
| : After heat resistance test | 31.0 | 29.4 | 28.6 | 27.4 | 29.4 | 31.4 | 29.4 |

TABLE 12

|  |  | Example 71 | Example 72 | Example 73 | Example 74 | Example 75 | Example 76 | Example 77 |
|---|---|---|---|---|---|---|---|---|
| Base fabric (i) |  | Nonwoven fabric | Nonwoven fabric | Nonwoven fabric | Nonwoven fabric | Nonwoven fabric | Nonwoven fabric | Nonwoven fabric |
| Surface skin layer (iii) |  | (iii-1) | (iii-1) | (iii-1) | (iii-1) | (iii-1) | (iii-1) | (iii-1) |
| Intermediate layer (ii) |  |  |  |  |  |  |  |  |
| Urethane prepolymer having isocyanate group (A) |  | (A-3) | (A-7) | (A-7) | (A-8) | (A-3) | (A-3) | (A-3) |
|  | Polycarbonate polyol (a1) |  |  |  |  |  |  |  |
|  | PC (parts by mass) | 70 | 70 | 70 | 70 | 70 | 70 | 70 |
|  | Other polyols |  |  |  |  |  |  |  |
|  | PEs (1) (parts by mass) | 30 |  |  | 30 | 30 | 30 | 30 |
|  | PEs (2) (parts by mass) |  | 30 | 30 |  |  |  |  |
|  | Polyisocyanate (a2) |  |  |  |  |  |  |  |
|  | MDI (parts by mass) | 25 | 25 | 25 |  | 25 | 25 | 25 |
|  | XDI (parts by mass) |  |  |  | 18 |  |  |  |
|  | NCO % (%) | 3.3 | 3.3 | 3.3 | 3.2 | 3.3 | 3.3 | 3.3 |
|  | Melting temperature (° C.) | 100 | 100 | 100 | 100 | 100 | 100 | 100 |
|  | Melt viscosity at 100° C. (mPa · s) | 2500 | 2300 | 2300 | 2200 | 2500 | 2500 | 2500 |
| Foaming agent composition (B) |  | (B-7) | (B-6) | (B-6) | (B-6) | (B-8) | (B-9) | (B-10) |
|  | N,N'-Dinitrosopentamethylenetetramine (b1) (parts by mass) | 2.5 | 2.5 | 2.5 | 2.5 | 1.5 | 3.5 | 5 |
|  | Urea (b2) (parts by mass) | 2.5 | 2.5 | 2.5 | 2.5 | 3.5 | 1.5 | 5 |
|  | Boric acid (b4) (parts by mass) | 0.5 | 0.5 | 0.5 | 0.5 | 0.5 | 0.5 | 1 |
|  | Polyol (b3) (parts by mass) |  |  |  |  |  |  |  |
|  | MN3050 (parts by mass) |  | 5 | 5 | 5 | 5 | 5 | 10 |
|  | T700 (parts by mass) | 5 |  |  |  |  |  |  |
|  | Mass ratio (b1)/(b2) | 50/50 | 50/50 | 50/50 | 50/50 | 30/70 | 70/30 | 50/50 |
| Amount of foaming agent composition used per 100 parts by mass of (A) (parts by mass) |  | 10.5 | 10.5 | 10.5 | 10.5 | 10.5 | 10.5 | 21 |
| Post-heating temperature (° C.) |  | 120 | 120 | 120 | 120 | 120 | 120 | 120 |
| Thickness of mixture applied (μm) |  | 30 | 30 | 50 | 30 | 30 | 30 | 30 |
| Thickness of foamed and cured product (μm) |  | 55 | 55 | 130 | 50 | 55 | 48 | 58 |
| Foaming degree of foamed and cured product |  | 2.1 | 2.2 | 2.3 | 2.0 | 2.4 | 2.0 | 2.8 |
| Evaluation of foamed state |  | A | A | A | A | A | A | A |
| Texture |  | A | A | A | A | A | A | A |
| Evaluation of Durability Peel strength (N/cm): Normal state |  | 25.5 | 27.4 | 29.4 | 23.5 | 26.5 | 21.2 | 23.1 |
| : After hydrolysis resistance test |  | 25.5 | 27.4 | 29.4 | 23.5 | 26.5 | 21.2 | 23.1 |
| : After heat resistance test |  | 24.7 | 27.4 | 29.4 | 23.5 | 26.5 | 21.2 | 22.7 |

TABLE 13

|  |  | Example 78 | Example 79 | Example 80 | Example 81 | Example 82 | Example 83 |
|---|---|---|---|---|---|---|---|
| Base fabric (i) |  | Nonwoven fabric | Nonwoven fabric | Nonwoven fabric | Nonwoven fabric | Nonwoven fabric | Nonwoven fabric |
| Surface skin layer (iii) |  | (iii-1) | (iii-2) | (iii-2) | (iii-2) | (iii-2) | (iii-2) |
| Intermediate layer (ii) |  |  |  |  |  |  |  |
| Urethane prepolymer having isocyanate group (A) |  | (A-3) | (A-3) | (A-3) | (A-3) | (A-3) | (A-7) |
|  | Polycarbonate polyol (a1) |  |  |  |  |  |  |
|  | PC (parts by mass) | 70 | 70 | 70 | 70 | 70 | 70 |
|  | Other polyols |  |  |  |  |  |  |
|  | PEs (1) (parts by mass) | 30 | 30 | 30 | 30 | 30 |  |
|  | PEs (2) (parts by mass) |  |  |  |  |  | 30 |
|  | Polyisocyanate (a2) |  |  |  |  |  |  |
|  | MDI (parts by mass) | 25 | 25 | 25 | 25 | 25 | 25 |
|  | NCO % (%) | 3.3 | 3.3 | 3.3 | 3.3 | 3.3 | 32 |
|  | Melting temperature (° C.) | 100 | 100 | 100 | 100 | 100 | 100 |
|  | Melt viscosity at 100° C. (mPa · s) | 2500 | 2500 | 2500 | 2500 | 2500 | 2300 |
| Foaming agent composition (B) |  | (B-11) | (B-1) | (B-1) | (B-6) | (B-6) | (B-6) |
|  | N,N'-Dinitrosopentamethylenetetramine (b1) (parts by mass) | 2.5 | 2.5 | 2.5 | 2.5 | 2.5 | 2.5 |
|  | Urea (b2) (parts by mass) | 2.5 | 2.5 | 2.5 | 2.5 | 2.5 | 2.5 |

TABLE 13-continued

|  |  | Example 78 | Example 79 | Example 80 | Example 81 | Example 82 | Example 83 |
|---|---|---|---|---|---|---|---|
|  | Boric acid (b4) (parts by mass) | 2.5 |  |  | 0.5 | 0.5 | 0.5 |
|  | Polyol (b3) (parts by mass) |  |  |  |  |  |  |
|  | MN3050 (parts by mass) | 5 | 5 | 5 | 5 | 5 | 5 |
|  | Mass ratio (b1)/(b2) | 50/50 | 50/50 | 50/50 | 50/50 | 50/50 | 50/50 |
| Other foaming agent compositions | Ethylene glycol (parts by mass) |  |  |  |  |  |  |
|  | N,N-Dimethylcyclohexylamine (parts by mass) |  |  |  |  |  |  |
|  | Water (parts by mass) |  |  |  |  |  |  |
| Amount of foaming agent composition used per 100 parts by mass of (A) (parts by mass) |  | 12.5 | 0.7 | 7.5 | 7.5 | 10 | 10 |
| Post-heating temperature (° C.) |  | 120 | — | 120 | 120 | 120 | 120 |
| Thickness of mixture applied (μm) |  | 30 | 30 | 30 | 30 | 30 | 30 |
| Thickness of foamed and cured product (μm) |  | 60 | 32 | 40 | 35 | 32 | 33 |
| Foaming degree of foamed and cured product |  | 2.8 | 1.2 | 1.6 | 1.1 | 1.2 | 1.1 |
| Evaluation of foamed state |  | A | A | A | A | A | A |
| Texture |  | A | B | B | A | A | A |
| Evaluation of Durability Peel strength (N/cm): Normal state |  | 20.8 | 21.6 | 19.6 | 20.4 | 18.8 | 20.0 |
| : After hydrolysis resistance test |  | 20.8 | 21.2 | 19.6 | 20.0 | 18.8 | 20.0 |
| : After heat resistance test |  | 20.4 | 21.2 | 19.6 | 19.6 | 18.8 | 20.0 |

TABLE 14

|  |  | Comparative Example 7 | Comparative Example 8 | Comparative Example 9 | Comparative Example 10 | Comparative Example 11 | Comparative Example 12 |
|---|---|---|---|---|---|---|---|
| Base fabric (i) |  | Nonwoven fabric (iii-1) | Nonwoven fabric (iii-1) | Nonwoven fabric (iii-1) | Nonwoven fabric (iii-1) | Nonwoven fabric (iii-1) | Nonwoven fabric (iii-1) |
| Surface skin layer (iii) |  |  |  |  |  |  |  |
| Intermediate layer (ii) |  |  |  |  |  |  |  |
| Urethane prepolymer having isocyanate group (A) |  | (A-1) | (A-1) | (A-1) | (A-1) | (A-1) | (A-1) |
| Polytetramethylene glycol (a1) |  |  |  |  |  |  |  |
| PTMG (parts by mass) |  | 70 | 70 | 70 | 70 | 70 | 70 |
| Other polyols |  |  |  |  |  |  |  |
| PEs (1) (parts by mass) |  | 30 | 30 | 30 | 30 | 30 | 30 |
| Polyisocyanate (a2) |  |  |  |  |  |  |  |
| MDI (parts by mass) |  | 25 | 25 | 25 | 25 | 25 | 25 |
| NCO % (%) |  | 3.3 | 3.3 | 3.3 | 3.3 | 3.3 | 3.3 |
| Melting temperature (° C.) |  | 100 | 100 | 100 | 100 | 100 | 100 |
| Melt viscosity at 100° C. (mPa·s) |  | 2000 | 2000 | 2000 | 2000 | 2000 | 2000 |
| Foaming agent composition (B) |  | (B'-1) | (B'-2) | (B'-3) | (B'-4) | (B'-5) |  |
| N,N'-Dinitrosopentamethylenetetramine (b1) (parts by mass) |  |  | 2.5 |  |  |  |  |
| Urea (b2) (parts by mass) |  |  |  | 2.5 | 2.5 | 2.5 | 2.5 |
| Boric acid (b4) (parts by mass) |  |  |  |  |  |  |  |
| Polyol (b3) (parts by mass) |  |  |  |  |  |  |  |
| MN3050 (parts by mass) |  |  | 5 | 5 | 5 | 5 | 5 |
| Mass ratio (b1)/(b2) |  |  | 100/0 | 0/100 | 0/100 | 0/100 | 0/100 |
| Other foaming agent compositions |  | (X-1) |  |  |  |  |  |
| Ethylene glycol (parts by mass) |  | 0.5 |  |  |  |  |  |
| N,N-Dimethylcyclohexylamine (parts by mass) |  | 0.1 |  |  |  |  |  |
| Water (parts by mass) |  | 0.1 |  |  |  |  |  |
| Azodicarbonamide (parts by mass) |  |  |  |  | 2.5 |  |  |
| 4,4'-Oxybis(benzenesulfonyl hydrazide) (parts by mass) |  |  |  |  |  | 2.5 |  |
| Sodium hydrogen carbonate (parts by mass) |  |  |  |  |  |  | 2.5 |
| Amount of foaming agent composition used per 100 parts by mass of (A) (parts by mass) |  | 0.7 | 7.5 | 7.5 | 7.5 | 10 | 10 |
| Post-heating temperature (° C.) |  | — | 120 | 120 | 120 | 120 | 120 |
| Thickness of mixture applied (μm) |  | 30 | 30 | 30 | 30 | 30 | 30 |
| Thickness of foamed and cured product (μm) |  | 32 | 40 | 35 | 32 | 33 | 32 |
| Foaming degree of foamed and cured product |  | 1.2 | 1.6 | 1.1 | 1.2 | 1.1 | 1.0 |
| Evaluation of foamed state |  | C | B | B | C | C | C |
| Texture |  | C | C | C | C | C | C |
| Hydrolysis resistance Peel strength (N/cm): Normal state |  | 15.7 | 15.7 | 14.9 | 14.9 | 15.7 | 11.8 |
| : After hydrolysis resistance test |  | 13.7 | 13.7 | 14.9 | 14.9 | 15.7 | 11.8 |
| Bending resistance: |  |  |  |  |  |  |  |
| Normal state: −10° C.: 100,000 times |  | T | T | T | T | T | T |
| 23° C. * 300,000 times |  | T | T | T | T | T | T |
| After hydrolysis resistance test: −10° C.: 100,000 times |  | T | T | T | T | T | T |
| 23° C. * 300,000 times |  | T | T | T | T | T | T |

The synthetic leathers of Examples 30 to 56 are synthetic leathers produced using a hot melt urethane prepolymer in which polyoxytetramethylene glycol was used as a main component of the polyol. It turned out that even in the case where an organic solvent, such as DMF, is not used in the formation of an intermediate layer of a synthetic leather, and the intermediate layer is a thin film, an excellent foamed state can be maintained. In addition, the synthetic leathers of the present invention were excellent in texture, bending resistance, and also hydrolysis resistance.

In addition, the synthetic leathers of Examples 57 to 83 are synthetic leathers produced using a hot melt urethane prepolymer in which a polycarbonate polyol was used as a main component of the polyol. It turned out that even in the case where an organic solvent, such as DMF, is not used in the formation of an intermediate layer of a synthetic leather, and the intermediate layer is a thin film, an excellent foamed state can be maintained. In addition, the synthetic leathers of the present invention were excellent in texture and durability.

Meanwhile, in Comparative Example 7, foaming by a water foaming method was studied. As a result, the foaming degree was low, and it was not possible to maintain an excellent foamed state. This suggests that there remained only bubbles involved during mixing the hot melt urethane prepolymer and the water-foamed composition. In addition, due to this, the texture of the synthetic leather was not excellent either.

Comparative Example 8 is an example in which urea (b2) was not used in the foaming agent composition (B). As a result, foaming was uncontrollable, asperities were felt on the surface of the obtained synthetic leather, and the texture was poor.

Comparative Example 9 is an example in which N,N'-dinitrosopentamethylenetetramine (b1) was not used in the foaming agent composition (B). As a result, the foaming degree was low, suggesting that there remained only bubbles involved during mixing the components (A) and (B). The texture of the obtained synthetic leather was also poor.

Comparative Examples 10 to 12 are modes in which N,N'-dinitrosopentamethylenetetramine (b1) was replaced with other heat-decomposable foaming agents. As a result, the foaming degree was low, and it was not possible to maintain an excellent foamed state in a thin film. In addition, due to this, the textures of the synthetic leathers were not excellent either.

The invention claimed is:

1. A moisture-curable hot melt urethane composition comprising:
    a hot melt urethane prepolymer (A) having an isocyanate group content of 1.1 to 3.3% by mass; and
    a foaming agent composition (B) containing N,N'-dinitrosopentamethylenetetramine (b1), urea (b2) and a polyol (b3),
    wherein the polyol (b3) is a polymerization product of polyoxypropylene triol and/or glycerin and propylene oxide having a number average molecular weight of 500 to 10,000, and
    wherein the mass ratio [(b1)+(b2)/(b3)] of the total mass of the N,N'-dinitrosopentamethylenetetramine (b1) and urea (b2) to the polyol (b3) is a range from 10/90 to 70/30.

2. The moisture-curable hot melt urethane composition according to claim 1, wherein the amount of the foaming agent composition (B) used is in the range of 1 to 30 parts by mass per 100 parts by mass of the hot melt urethane prepolymer (A).

3. The moisture-curable hot melt urethane composition according to claim 1, wherein the mass ratio [(b1)/(b2)] between the N,N'-dinitrosopentamethylenetetramine (b1) and urea (b2) is in the range of 10/90 to 90/10.

4. The moisture-curable hot melt urethane composition according to claim 1, wherein the foaming agent composition (B) further contains boric acid (b4).

5. The moisture-curable hot melt urethane composition according to claim 4, wherein the amount of the boric acid (b4) used is in the range of 5 to 150 parts by mass per 100 parts by mass of the urea (b2).

6. A synthetic leather comprising a base fabric (i), an intermediate layer (ii), and a surface skin layer (iii),
    in which the intermediate layer (ii) is a foamed and cured product of the moisture-curable hot melt urethane composition according to claim 1.

7. The synthetic leather according to claim 6, wherein the surface skin layer (iii) is made of a water-based urethane resin.

8. A method for producing a foamed and cured product of a moisture-curable hot melt urethane composition, which comprises
    heat-melting a hot melt urethane prepolymer (A) having an isocyanate group in a content of 1.1 to 3.3% by mass,
    mixing a foaming agent composition (B) containing N,N'-dinitrosopentamethylenetetramine (b1), urea (b2), and a polyol (b3) therewith,
    applying the resultant mixture to a substrate, and
    performing a heating treatment at a temperature equal to or higher than the heat-melting temperature of the hot melt urethane prepolymer (A) to thereby cause foaming and curing,
    wherein the polyol (b3) is a polymerization product of polyoxypropylene triol and/or glycerin and propylene oxide having a number average molecular weight of 500 to 10,000, and
    wherein the mass ratio [(b1)+(b2)/(b3)] of the total mass of the N,N'-dinitrosopentamethylenetetramine (b1) and urea (b2) to the polyol (b3) is a range from 10/90 to 70/30.

9. A method for producing a synthetic leather, which comprises heat-melting a hot melt urethane prepolymer (A) having an isocyanate group in a content of 1.1 to 3.3% by mass,
    mixing a foaming agent composition (B) containing N,N'-dinitrosopentamethylenetetramine (b1), urea (b2), and a polyol (b3) therewith to give a moisture-curable hot melt urethane composition,
    applying the moisture-curable hot melt composition onto a surface skin layer (iii) formed on a release paper,
    performing a heating treatment at a temperature equal to or higher than the heat-melting temperature of the hot melt urethane prepolymer (A) to form an intermediate layer (ii), and
    subsequently attaching a base fabric (i) onto the intermediate layer (ii),
    wherein the polyol (b3) is a polymerization product of polyoxypropylene triol and/or glycerin and propylene oxide having a number average molecular weight of 500 to 10,000, and
    wherein the mass ratio [(b1)+(b2)/(b3)] of the total mass of the N,N'-dinitrosopentamethylenetetramine (b1) and urea (b2) to the polyol (b3) is a range from 10/90 to 70/30.

* * * * *